United States Patent
Xu et al.

(10) Patent No.: US 11,856,580 B2
(45) Date of Patent: Dec. 26, 2023

(54) PRECONFIGURED UPLINK RESOURCE RESPONSE SIGNALING

(71) Applicant: QUALCOMM Incorporated, San Diego, CA (US)

(72) Inventors: Huilin Xu, San Diego, CA (US); Liangping Ma, San Diego, CA (US); Jing Lei, San Diego, CA (US); Xiao Feng Wang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 122 days.

(21) Appl. No.: 17/142,001

(22) Filed: Jan. 5, 2021

(65) Prior Publication Data

US 2022/0217712 A1    Jul. 7, 2022

(51) Int. Cl.
*H04W 72/21* (2023.01)
*H04W 72/0446* (2023.01)

(52) U.S. Cl.
CPC ....... *H04W 72/21* (2023.01); *H04W 72/0446* (2013.01)

(58) Field of Classification Search
CPC ......... H04W 72/0406; H04W 72/0413; H04W 72/044; H04W 72/0493
See application file for complete search history.

(56) References Cited

U.S. PATENT DOCUMENTS

| | | |
|---|---|---|
| 2020/0351023 A1 | 11/2020 | Rico Alvarino et al. |
| 2020/0383085 A1 | 12/2020 | Shih |
| 2022/0007455 A1* | 1/2022 | Hong ............... H04W 76/28 |
| 2022/0015120 A1* | 1/2022 | Qiu ............... H04B 7/185 |
| 2022/0039009 A1* | 2/2022 | Iyer ............... H04W 72/044 |
| 2022/0210798 A1* | 6/2022 | Tsai ............... H04L 5/0051 |
| 2022/0369136 A1* | 11/2022 | Goektepe ............... H04W 68/00 |

OTHER PUBLICATIONS

International Search Report and Written Opinion—PCT/US2021/072238—ISA/EPO—dated Feb. 23, 2022.

* cited by examiner

*Primary Examiner* — Bo Hui A Zhu
(74) *Attorney, Agent, or Firm* — Holland & Hart LLP

(57) ABSTRACT

Methods, systems, and devices for wireless communications are described. Generally, a user equipment (UE) may communicate with a network device in an idle or disconnected state using preconfigured uplink resources (PURs). The UE may transmit uplink data, and may begin to monitor for a PUR response message corresponding to the uplink data after a configurable time offset. The Base station may indicate the configurable time offset in an RRC release message, another message, or the UE may select the configurable time offset from a set of configurable time offsets based on one or more system parameter values. Additionally, the UE may not monitor for PUR response messages after every PUR occasion during which it transmits uplink data.

21 Claims, 20 Drawing Sheets

PRECONFIGURED UPLINK RESOURCE RESPONSE SIGNALING

FIELD OF TECHNOLOGY

The following relates to wireless communications, including preconfigured uplink resource response signaling.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE). In some examples, a UE may communicate with a base station on one or more preconfigured uplink resources (PURs).

SUMMARY

The described techniques relate to improved methods, systems, devices, and apparatuses that support preconfigured uplink resource response signaling. Generally, a user equipment (UE) may communicate with a network device in an idle or inactivestate using preconfigured uplink resources (PURs). The UE may transmit uplink data, and may begin to monitor for a PUR response message corresponding to the uplink data after a configurable time offset. The Base station may indicate the configurable time offset in an RRC release message, another message, or the UE may select the configurable time offset from a set of configurable time offsets based on one or more system parameter values. Additionally, the UE may not monitor for PUR response messages after every PUR occasion during which it transmits uplink data. The network device may indicate a monitoring periodicity, the UE may select a periodicity from a set of candidate monitoring periodicities based on system parameter values, the base station may dynamically indicate when the UE should monitor for PUR response messages, or the UE may dynamically request PUR response messages.

A method for wireless communications at a user equipment (UE) is described. The method may include receiving preconfigured uplink resource configuration information from a network device while the UE is in a connected state, transitioning from the connected state, transmitting, to the network device, a data transmission during a preconfigured uplink resource occasion in accordance with the preconfigured uplink resource configuration information and while the UE is outside of the connected state, and monitoring for a preconfigured uplink resource response message from the network device after a configurable time offset triggered by the data transmission.

An apparatus for wireless communications at a UE is described. The apparatus may include a processor, memory in electronic communication with the processor, and instructions stored in the memory. The instructions may be executable by the processor to cause the apparatus to receive preconfigured uplink resource configuration information from a network device while the UE is in a connected state, transition from the connected state, transmit, to the network device, a data transmission during a preconfigured uplink resource occasion in accordance with the preconfigured uplink resource configuration information and while the UE is outside of the connected state, and monitor for a preconfigured uplink resource response message from the network device after a configurable time offset triggered by the data transmission.

Another apparatus for wireless communications at a UE is described. The apparatus may include means for receiving preconfigured uplink resource configuration information from a network device while the UE is in a connected state, means for transitioning from the connected state, means for transmitting, to the network device, a data transmission during a preconfigured uplink resource occasion in accordance with the preconfigured uplink resource configuration information and while the UE is outside of the connected state, and means for monitoring for a preconfigured uplink resource response message from the network device after a configurable time offset triggered by the data transmission.

A non-transitory computer-readable medium storing code for wireless communications at a UE is described. The code may include instructions executable by a processor to receive preconfigured uplink resource configuration information from a network device while the UE is in a connected state, transition from the connected state, transmit, to the network device, a data transmission during a preconfigured uplink resource occasion in accordance with the preconfigured uplink resource configuration information and while the UE is outside of the connected state, and monitor for a preconfigured uplink resource response message from the network device after a configurable time offset triggered by the data transmission.

Some examples of the method, apparatuses, and non-transitory computer-readable medium described herein may further include operations, features, means, or instructions for receiving, from the network device, an indication of the configurable time offset.

Some examples of the method, apparatuses, and non-transitory computer-readable medium described herein may further include operations, features, means, or instructions for receiving, from the network device, a first control message including the preconfigured uplink resource configuration information, the first control message including an instruction to transition out of the connected state and the indication of the configurable time offset.

Some examples of the method, apparatuses, and non-transitory computer-readable medium described herein may further include operations, features, means, or instructions for receiving, from the network device, a first control message including an indication of the configurable time offset and receiving, from the network device, a second control message including the preconfigured uplink resource configuration information and an instruction to transition out of the connected state.

Some examples of the method, apparatuses, and non-transitory computer-readable medium described herein may further include operations, features, means, or instructions for determining a maximum round-trip time between the UE and the network device and selecting the configurable time offset from a set of configurable time offset values based on the maximum round-trip time.

In some examples of the method, apparatuses, and non-transitory computer-readable medium described herein, determining the maximum round-trip time between the UE and the network device may include operations, features, means, or instructions for determining the maximum round-trip time based on an orbital height of a non-terrestrial network satellite serving the UE and a minimum angle of elevation of the non-terrestrial network satellite serving the UE.

In some examples of the method, apparatuses, and non-transitory computer-readable medium described herein, the configurable time offset defines a delay between an end of the data transmission and initiation of monitoring, by the UE, for the preconfigured uplink resource response message.

Some examples of the method, apparatuses, and non-transitory computer-readable medium described herein may further include operations, features, means, or instructions for determining the configurable time offset as a summation of a base time offset with a delta time offset.

Some examples of the method, apparatuses, and non-transitory computer-readable medium described herein may further include operations, features, means, or instructions for receiving the preconfigured uplink resource response message from the network device based on the monitoring.

In some examples of the method, apparatuses, and non-transitory computer-readable medium described herein, the preconfigured uplink resource response message includes a feedback message, a timing advance command, updated preconfigured uplink resource configuration information, an instruction to transition to the connected state, an instruction to refrain from transmitting subsequent data transmissions during subsequent preconfigured uplink resource occasions, or any combination thereof.

In some examples of the method, apparatuses, and non-transitory computer-readable medium described herein, communication between the UE and the network device may be via a non-terrestrial network.

A method for wireless communications at a UE is described. The method may include receiving preconfigured uplink resource configuration information from a network device while the UE is in a connected state, transitioning from the connected state, transmitting, to the network device, a set of multiple data transmissions during a respective set of multiple preconfigured uplink resource occasions in accordance with the preconfigured uplink resource configuration information and while the UE is outside of the connected state, and monitoring for one or more preconfigured uplink resource response messages from the network device, where a number of the one or more preconfigured uplink resource response messages is less than the set of multiple data transmissions transmitted by the UE.

An apparatus for wireless communications at a UE is described. The apparatus may include a processor, memory in electronic communication with the processor, and instructions stored in the memory. The instructions may be executable by the processor to cause the apparatus to receive preconfigured uplink resource configuration information from a network device while the UE is in a connected state, transition from the connected state, transmit, to the network device, a set of multiple data transmissions during a respective set of multiple preconfigured uplink resource occasions in accordance with the preconfigured uplink resource configuration information and while the UE is outside of the connected state, and monitor for one or more preconfigured uplink resource response messages from the network device, where a number of the one or more preconfigured uplink resource response messages is less than the set of multiple data transmissions transmitted by the UE.

Another apparatus for wireless communications at a UE is described. The apparatus may include means for receiving preconfigured uplink resource configuration information from a network device while the UE is in a connected state, means for transitioning from the connected state, means for transmitting, to the network device, a set of multiple data transmissions during a respective set of multiple preconfigured uplink resource occasions in accordance with the preconfigured uplink resource configuration information and while the UE is outside of the connected state, and means for monitoring for one or more preconfigured uplink resource response messages from the network device, where a number of the one or more preconfigured uplink resource response messages is less than the set of multiple data transmissions transmitted by the UE.

A non-transitory computer-readable medium storing code for wireless communications at a UE is described. The code may include instructions executable by a processor to receive preconfigured uplink resource configuration information from a network device while the UE is in a connected state, transition from the connected state, transmit, to the network device, a set of multiple data transmissions during a respective set of multiple preconfigured uplink resource occasions in accordance with the preconfigured uplink resource configuration information and while the UE is outside of the connected state, and monitor for one or more preconfigured uplink resource response messages from the network device, where a number of the one or more preconfigured uplink resource response messages is less than the set of multiple data transmissions transmitted by the UE.

Some examples of the method, apparatuses, and non-transitory computer-readable medium described herein may further include operations, features, means, or instructions for receiving, from the network device, an indication of a periodicity for monitoring for the one or more preconfigured uplink resource response messages.

In some examples of the method, apparatuses, and non-transitory computer-readable medium described herein, monitoring for the one or more preconfigured uplink resource response messages may include operations, features, means, or instructions for monitoring for the one or more preconfigured uplink resource response messages once per period within the periodicity, where each period includes more than one of the set of multiple preconfigured uplink resource occasions.

In some examples of the method, apparatuses, and non-transitory computer-readable medium described herein, the period may be based on a number of preconfigured uplink resource occasions.

In some examples of the method, apparatuses, and non-transitory computer-readable medium described herein, the period may be based on a time duration.

Some examples of the method, apparatuses, and non-transitory computer-readable medium described herein may further include operations, features, means, or instructions for determining one or more system parameter values pertaining to a deployment of the network device and selecting a periodicity from a set of periodicities for monitoring for the one or more preconfigured uplink resource response messages based on the one or more system parameter values.

In some examples of the method, apparatuses, and non-transitory computer-readable medium described herein, a maximum round-trip time for communications between the UE and a satellite in a non-terrestrial network used for communications between the UE and the network device, an orbital height of the satellite, an angle of elevation of the satellite with reference to the UE, or any combination thereof.

Some examples of the method, apparatuses, and non-transitory computer-readable medium described herein may further include operations, features, means, or instructions for receiving, from the network device, an indication of a next instance when the UE may be to monitor for a preconfigured uplink resource response message of the one or more preconfigured uplink resource response messages.

In some examples of the method, apparatuses, and non-transitory computer-readable medium described herein, receiving the indication of the next instance for the UE to monitor for the preconfigured uplink resource response message may include operations, features, means, or instructions for receiving the indication in a previous preconfigured uplink resource response message that may be different from the preconfigured uplink resource response message indicated by the indication.

Some examples of the method, apparatuses, and non-transitory computer-readable medium described herein may further include operations, features, means, or instructions for transmitting, to the network device, a request that the network device transmit a preconfigured uplink resource response message, where monitoring for the one or more preconfigured uplink resource response messages includes monitoring for the requested preconfigured uplink resource response message.

In some examples of the method, apparatuses, and non-transitory computer-readable medium described herein, the request may be included in one of the set of multiple data transmissions.

Some examples of the method, apparatuses, and non-transitory computer-readable medium described herein may further include operations, features, means, or instructions for receiving a preconfigured uplink resource response message from the one or more preconfigured uplink resource response messages, where the received preconfigured uplink resource response message includes feedback information for multiple data transmissions of the set of multiple data transmissions.

In some examples of the method, apparatuses, and non-transitory computer-readable medium described herein, communication between the UE and the network device may be via a non-terrestrial network.

A method for wireless communications at a network device is described. The method may include transmitting preconfigured uplink resource configuration information from to a UE while the UE is in a connected state, receiving, from the UE based on transmitting the preconfigured uplink resource configuration information, a data transmission during a preconfigured uplink resource occasion in accordance with the preconfigured uplink resource configuration information and while the UE is outside of the connected state, and transmitting, to the UE based on receiving the data transmission, a preconfigured uplink resource response message after a configurable time offset triggered by the data transmission.

An apparatus for wireless communications at a network device is described. The apparatus may include a processor, memory in electronic communication with the processor, and instructions stored in the memory. The instructions may be executable by the processor to cause the apparatus to transmit preconfigured uplink resource configuration information from to a UE while the UE is in a connected state, receive, from the UE based on transmitting the preconfigured uplink resource configuration information, a data transmission during a preconfigured uplink resource occasion in accordance with the preconfigured uplink resource configuration information and while the UE is outside of the connected state, and transmit, to the UE based on receiving the data transmission, a preconfigured uplink resource response message after a configurable time offset triggered by the data transmission.

Another apparatus for wireless communications at a network device is described. The apparatus may include means for transmitting preconfigured uplink resource configuration information from to a UE while the UE is in a connected state, means for receiving, from the UE based on transmitting the preconfigured uplink resource configuration information, a data transmission during a preconfigured uplink resource occasion in accordance with the preconfigured uplink resource configuration information and while the UE is outside of the connected state, and means for transmitting, to the UE based on receiving the data transmission, a preconfigured uplink resource response message after a configurable time offset triggered by the data transmission.

A non-transitory computer-readable medium storing code for wireless communications at a network device is described. The code may include instructions executable by a processor to transmit preconfigured uplink resource configuration information from to a UE while the UE is in a connected state, receive, from the UE based on transmitting the preconfigured uplink resource configuration information, a data transmission during a preconfigured uplink resource occasion in accordance with the preconfigured uplink resource configuration information and while the UE is outside of the connected state, and transmit, to the UE based on receiving the data transmission, a preconfigured uplink resource response message after a configurable time offset triggered by the data transmission.

Some examples of the method, apparatuses, and non-transitory computer-readable medium described herein may further include operations, features, means, or instructions for transmitting, to the UE, an indication of the configurable time offset.

Some examples of the method, apparatuses, and non-transitory computer-readable medium described herein may further include operations, features, means, or instructions for transmitting, to the UE, a first control message including the preconfigured uplink resource configuration information, the first control message including an instruction to transition out of the connected state and the indication of the configurable time offset.

Some examples of the method, apparatuses, and non-transitory computer-readable medium described herein may further include operations, features, means, or instructions for transmitting, to the UE, a first control message including an indication of the configurable time offset and transmitting, to the UE, a second control message including the preconfigured uplink resource configuration information and an instruction to transition out of the connected state.

Some examples of the method, apparatuses, and non-transitory computer-readable medium described herein may further include operations, features, means, or instructions for determining a maximum round-trip time between the UE and the network device and selecting the configurable time offset from a set of configurable time offset values based on the maximum round-trip time.

In some examples of the method, apparatuses, and non-transitory computer-readable medium described herein, determining the maximum round-trip time between the UE and the network device may include operations, features, means, or instructions for determining the maximum round-trip time based on an orbital height of a non-terrestrial network satellite serving the UE and a minimum angle of elevation of the non-terrestrial network satellite serving the UE.

In some examples of the method, apparatuses, and non-transitory computer-readable medium described herein, where the configurable time offset defines a delay between an end of the data transmission and initiation of monitoring, by the UE, for the preconfigured uplink resource response message.

Some examples of the method, apparatuses, and non-transitory computer-readable medium described herein may further include operations, features, means, or instructions for determining the configurable time offset as a summation of a base time offset with a delta time offset.

In some examples of the method, apparatuses, and non-transitory computer-readable medium described herein, the preconfigured uplink resource response message includes a feedback message, a timing advance command, updated preconfigured uplink resource configuration information, an instruction to transition to the connected state, an instruction to refrain from transmitting subsequent data transmissions during subsequent preconfigured uplink resource occasions, or any combination thereof.

In some examples of the method, apparatuses, and non-transitory computer-readable medium described herein, communication between the UE and the network device may be via a non-terrestrial network.

A method for wireless communications at a network device is described. The method may include transmitting preconfigured uplink resource configuration information to a UE device while the UE is in a connected state, receiving, from the UE, a set of multiple data transmissions during a respective set of multiple preconfigured uplink resource occasions in accordance with the preconfigured uplink resource configuration information and while the UE is outside of the connected state, and transmitting, to the UE based on receiving the set of multiple data transmissions, one or more preconfigured uplink resource response messages, where a number of the one or more preconfigured uplink resource response messages is less than the set of multiple data transmissions transmitted by the UE.

An apparatus for wireless communications at a network device is described. The apparatus may include a processor, memory in electronic communication with the processor, and instructions stored in the memory. The instructions may be executable by the processor to cause the apparatus to transmit preconfigured uplink resource configuration information to a UE device while the UE is in a connected state, receive, from the UE, a set of multiple data transmissions during a respective set of multiple preconfigured uplink resource occasions in accordance with the preconfigured uplink resource configuration information and while the UE is outside of the connected state, and transmit, to the UE based on receiving the set of multiple data transmissions, one or more preconfigured uplink resource response messages, where a number of the one or more preconfigured uplink resource response messages is less than the set of multiple data transmissions transmitted by the UE.

Another apparatus for wireless communications at a network device is described. The apparatus may include means for transmitting preconfigured uplink resource configuration information to a UE device while the UE is in a connected state, means for receiving, from the UE, a set of multiple data transmissions during a respective set of multiple preconfigured uplink resource occasions in accordance with the preconfigured uplink resource configuration information and while the UE is outside of the connected state, and means for transmitting, to the UE based on receiving the set of multiple data transmissions, one or more preconfigured uplink resource response messages, where a number of the one or more preconfigured uplink resource response messages is less than the set of multiple data transmissions transmitted by the UE.

A non-transitory computer-readable medium storing code for wireless communications at a network device is described. The code may include instructions executable by a processor to transmit preconfigured uplink resource configuration information to a UE device while the UE is in a connected state, receive, from the UE, a set of multiple data transmissions during a respective set of multiple preconfigured uplink resource occasions in accordance with the preconfigured uplink resource configuration information and while the UE is outside of the connected state, and transmit, to the UE based on receiving the set of multiple data transmissions, one or more preconfigured uplink resource response messages, where a number of the one or more preconfigured uplink resource response messages is less than the set of multiple data transmissions transmitted by the UE.

Some examples of the method, apparatuses, and non-transitory computer-readable medium described herein may further include operations, features, means, or instructions for transmitting, to the UE, an indication of a periodicity for monitoring for the one or more preconfigured uplink resource response messages.

In some examples of the method, apparatuses, and non-transitory computer-readable medium described herein, transmitting the one or more preconfigured uplink resource response messages may include operations, features, means, or instructions for transmitting the one or more preconfigured uplink resource response messages once per period within the periodicity, where each period includes more than one of the set of multiple preconfigured uplink resource occasions.

In some examples of the method, apparatuses, and non-transitory computer-readable medium described herein, the period may be based on a number of preconfigured uplink resource occasions.

In some examples of the method, apparatuses, and non-transitory computer-readable medium described herein, the period may be based on a time duration.

Some examples of the method, apparatuses, and non-transitory computer-readable medium described herein may further include operations, features, means, or instructions for determining one or more system parameter values pertaining to a deployment of the network device and selecting a periodicity from a set of periodicities for transmitting the one or more preconfigured uplink resource response messages based on the one or more system parameter values.

In some examples of the method, apparatuses, and non-transitory computer-readable medium described herein, the one or more system parameter values include a maximum round-trip time for communications between the UE and a satellite in a non-terrestrial network used for communications between the UE and the network device, an orbital height of the satellite, an angle of elevation of the satellite with reference to the UE, or any combination thereof.

Some examples of the method, apparatuses, and non-transitory computer-readable medium described herein may further include operations, features, means, or instructions for transmitting, to the UE, an indication of a next instance when the UE may be to monitor for a preconfigured uplink resource response message of the one or more preconfigured uplink resource response messages.

In some examples of the method, apparatuses, and non-transitory computer-readable medium described herein, transmitting the indication of the next instance for the UE to monitor for the preconfigured uplink resource response message may include operations, features, means, or instructions for transmitting the indication in a previous preconfigured uplink resource response message that may be different from the preconfigured uplink resource response message indicated by the indication.

Some examples of the method, apparatuses, and non-transitory computer-readable medium described herein may further include operations, features, means, or instructions for receiving, from the UE, a request that the network device transmit a preconfigured uplink resource response message, where transmitting the one or more preconfigured uplink resource response messages includes transmitting the requested preconfigured uplink resource response message.

In some examples of the method, apparatuses, and non-transitory computer-readable medium described herein, the request may be included in one of the set of multiple data transmissions.

Some examples of the method, apparatuses, and non-transitory computer-readable medium described herein may further include operations, features, means, or instructions for transmitting, to the UE, a preconfigured uplink resource response message from the one or more preconfigured uplink resource response messages, where the transmitted preconfigured uplink resource response message includes feedback information for multiple data transmissions of the set of multiple data transmissions.

In some examples of the method, apparatuses, and non-transitory computer-readable medium described herein, communication between the UE and the network device may be via a non-terrestrial network.

DETAILED DESCRIPTION

Figure 1:
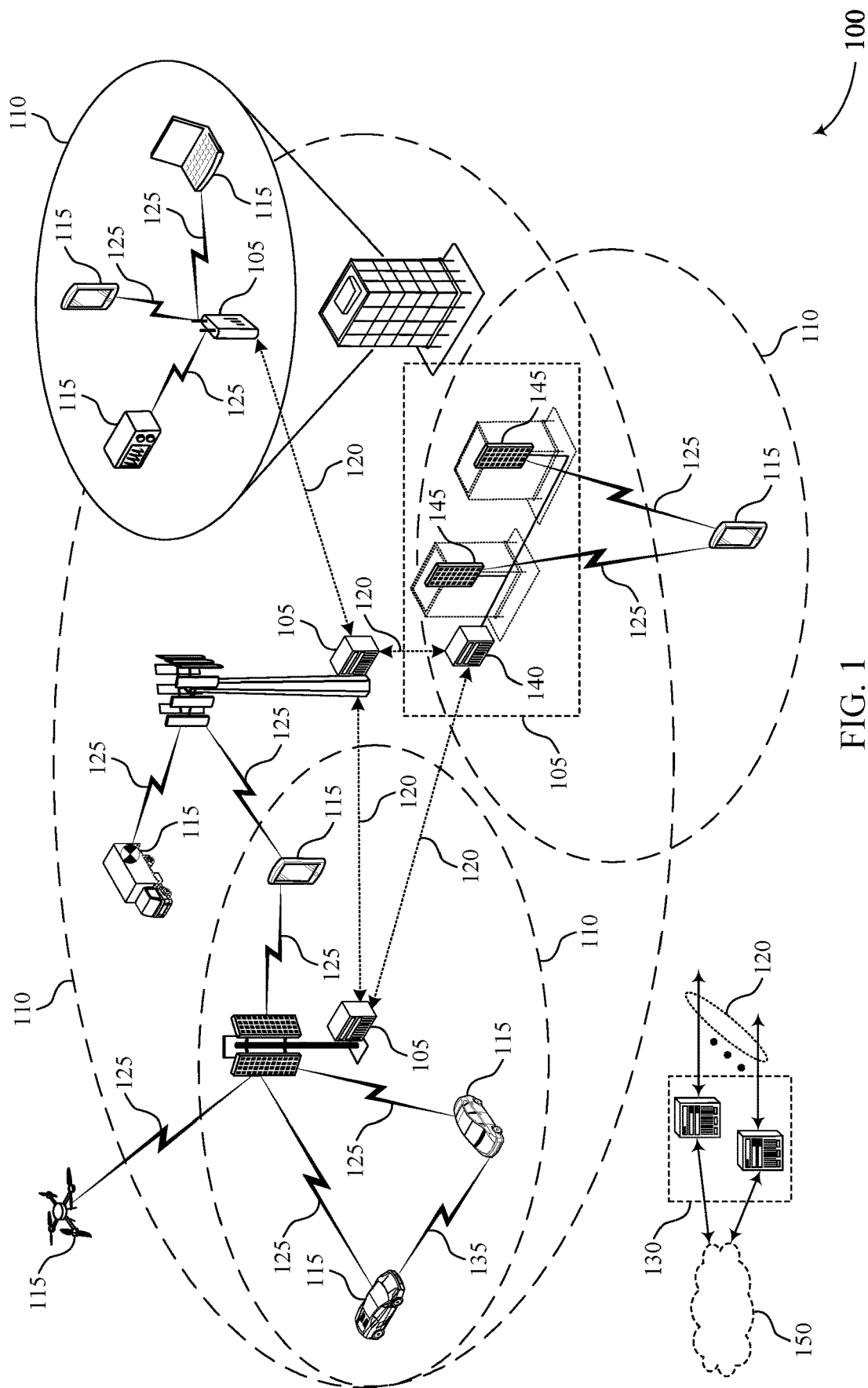
FIG. 1 illustrates an example of a wireless communications system that supports preconfigured uplink resource response signaling in accordance with aspects of the present disclosure.

In some examples of a wireless communications system, a user equipment (UE) in communication with a network device (e.g., a satellite in a non-terrestrial network (NTN) or a relay base station in communication with the UE and a satellite in a NTN deployment) may transition from a connected mode to an idle or inactive mode. The network device may transmit a message (e.g., a radio resource control (RRC) release message), to the UE, instructing the UE to release an RRC connection with the network device and transition to the idle or inactive mode. The network device may include, in the RRC release message, preconfigured uplink resource (PUR) configuration information. The PUR configuration information may include an indication of specified time-frequency resources (e.g., PUR occasions) during which the UE may transmit uplink data to the network device without re-establishing a connection with the network device. Communicating during PUR occasions in an idle or inactive mode may allow the UE to periodically transmit uplink data (e.g., on a physical uplink shared channel (PUSCH)) without performing a connection establishment procedure or performing resume protocols. For instance, the UE may transmit small size sensor data such as moisture measurements, atmospheric data, or the like, in a PUR occasion without transmitting a request for connection reestablishment, or entering an active or awake mode for an unnecessary amount of time. Such techniques may result in decreased power expenditures by the UE, increased battery life, and more efficient use of available resources resulting in decreased system latency.

Upon receiving uplink data transmissions during configured PUR occasions, the network device may transmit a PUR response message to the UE. The PUR response message may include an acknowledgement (ACK) message indicating successful decoding of the data received during the PUR occasion, a timing advance (TA) command to adjust the UE uplink timing, an adjustment of the PUR configuration information (e.g., modifying or updating the time-frequency resources of the PURs), a command instructing the UE to stop transmitting data during uplink PUR occasions (e.g., to re-establish an RRC connection with the network device), or the like.

The UE may transmit uplink data during a PUR occasion, and may begin monitoring for PUR response message after a time offset from transmission of the uplink data during the PUR occasion. In some cases, the time offset may be a predefined value and may span a certain number of subframes or an amount of time. For example, the UE may begin monitoring for the PUR response 4 ms after transmitting data during a corresponding PUR occasion.

In some examples of a wireless communications system, the round-trip time (RTT) for a signal to reach its destination and a feedback message to be returned may be significantly longer than the fixed time offset. In such an example, the UE may monitor for a PUR response message for an unnecessary amount of time following the time offset. For instance, in a non-terrestrial network (NTN), a UE may communicate with a network device (e.g., a satellite) in a low earth orbit (LEO) where the RTT between the UE and network device is longer than a fixed time offset (e.g., 4 ms). In such examples, the UE may begin monitoring for a PUR response 4 ms (e.g., the time offset) after transmitting uplink data, but the UE may continue to monitor for a significant amount of time (e.g., the remaining duration of the RTT) after the fixed time offset before receiving the PUR response. Thus, the UE may monitor for the PUR response for an unnecessarily long time interval, reducing the benefits of transitioning from the connected state to communicate on PURs, and increasing power consumption at the UE. In some examples, the UE may determine, based on the extended monitoring, that no feedback message is pending (e.g., because of the duration of the RTT), and may send one or more unnecessary retransmissions. This may result in increased system latency, communication delays, failed transmissions, and the like.

Additionally, the UE may monitor for PUR response message after every PUR occasion. Such monitoring may result in unnecessary power expenditures. If the RTT for signals transmitted between a UE and a network device is particularly long, the number of PUR occasions during a given time interval may be limited. If a wireless communication system supports UE to monitoring for PUR response messages after every PUR occasion, particularly in cases with longer RTT durations, a UE may be limited to a smaller number of PURs in a given time interval, which may result in slower communications and diminished system efficiency. In some cases, this issue may be addressed by removing hybrid automatic repeat request (HARQ) from PUR response messages, so the network device may not acknowledge successful decoding of data transmitted on the PUR. However, HARQ-less communications may result in the loss of information transmitted by the UE. For instance, the UE may transmit an indication of a measurement to a network device. If the network device fails to decode the measurement indication and the network device does not transmit HARQ feedback to the UE indicating the decoding failure, the information may be permanently lost. Thus, both HARQ-less transmissions and requiring the UE to monitor for PUR response after every UE occasion may result in slower communications, decreased system efficiency, or the like.

In some examples, a wireless communications system may support a UE and a network device communicating according to a PUR configuration with a configurable time offset. In some examples, UEs in the wireless communications system may not monitor for PUR response messages after every PUR occasion. Instead, UEs may monitor for PUR response messages according to a configured or predefined monitoring pattern, or may monitor for PUR response messages as dynamically instructed or as requested by the UE.

In some cases, the UE may transmit uplink data during one or more PUR occasions, and may monitor for PUR response messages after a configurable time offset. In some examples, the network may include an indication of the configurable time offset in the PUR configuration information. In some examples, the network may configure the configurable time offset within a message separate from the message including the PUR configuration information. In some examples, the UE may select the configurable time offset from a set of predefined configurable time offsets based on one or more system parameter values. The system parameter values may include an RTT delay between the UE and the network device, an orbital height of the network device, an angle of elevation of the network device with reference to the UE, or the like.

In some examples, the configurable time offset may indicate an amount of time between the end of an uplink data transmission and the beginning of the corresponding PUR response. In some cases, the configurable time offset may be a positive offset applied to a base (e.g., legacy) time offset.

In some examples, the UE may not monitor for PUR response message after every PUR occasion. Likewise, the network device may not transmit PUR response message after every PUR occasion. In some cases, the network may configure a pattern for the flexible PUR response, and may indicate the pattern to the UE. In such a case, the network may indicate to the UE that the UE should monitor for PUR response message according to a pattern or periodicity. Each period of the indicated periodicity may correspond to a number of PUR occasions, or a time delay. In some cases, the UE may select a pattern for PUR response messages from a set of pre-defined patterns based on one or more the system parameter values. For instance, the UE and the network device may identify a RTT (e.g., in an NTN system), and may select a monitoring pattern (e.g., a periodicity for transmitting PUR response messages) based on the RTT. In some cases, the network may include, in a current PUR response, an indication of a next PUR occasion after which the UE is to monitor for a next PUR response. In some examples, the UE may request that the network send PUR response message after a particular data transmission. In such examples, the UE may include this request in an uplink data transmission during a PUR occasion.

In some examples, the flexible PUR response may include feedback information (e.g., decoding results) for multiple uplink transmissions received during multiple consecutive PUR occasions. For example, a network device may transmit, to the UE, a PUR message including multiple feedback messages indicating whether each of the past uplink transmissions received after a most recent PUR response message has been successfully decoded.

Communicating on a PUR with a configurable timing offset and a flexible PUR response may result in enhanced system efficiency, faster communications, and diminished power consumption at the UE.

Aspects of the disclosure are initially described in the context of wireless communications systems. Aspects of the disclosure are further illustrated by and described with reference to process flows, timelines, and PUR response messages. Aspects of the disclosure are further illustrated by and described with reference to apparatus diagrams, system diagrams, and flowcharts that relate to preconfigured uplink resource response signaling.

FIG. 1 illustrates an example of a wireless communications system 100 that supports preconfigured uplink resource response signaling in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

A UE 115 may communicate with a network device in an idle or disconnected state using preconfigured uplink resources (PURs). The UE 115 may transmit uplink data, and may begin to monitor for a PUR response message corresponding to the uplink data after a configurable time offset. The Base station may indicate the configurable time offset in an RRC release message, another message, or the UE 115 may select the configurable time offset from a set of configurable time offsets based on one or more system parameter values. Additionally, the UE 115 may not monitor for PUR response messages after every PUR occasion during which it transmits uplink data. The network device may indicate a monitoring periodicity, the UE 115 may select a periodicity from a set of candidate monitoring periodicities based on system parameter values, the base station may dynamically indicate when the UE 115 should monitor for PUR response messages, or the UE 115 may dynamically request PUR response messages.

Figure 2:
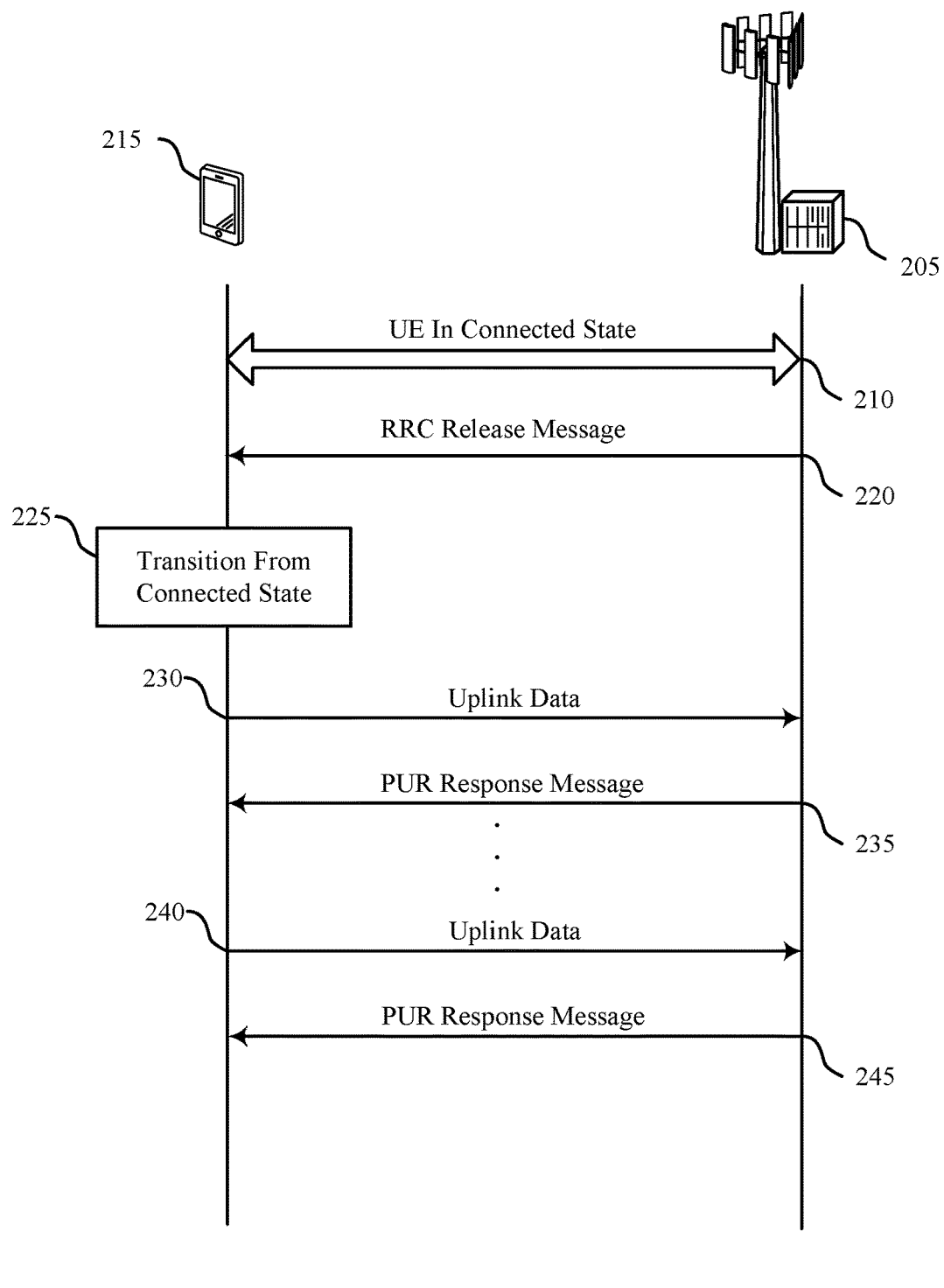
FIG. 2 illustrates an example of a process flow that supports preconfigured uplink resource response signaling in accordance with aspects of the present disclosure.

FIG. 2 illustrates an example of a process flow 200 that supports techniques for wireless communications using a preconfigured uplink resource (PUR) in accordance with aspects of the present disclosure. In some examples, the process flow 200 may implement aspects of the wireless communications system as described with reference to FIG. 1. The process flow 200 shows an example of communications between a network device 205 and a UE 215 which may be examples of base stations 105 and UEs 115, respectively, as described with reference to FIG. 1. Alternative examples of the following may be implemented, where some steps are performed in a different order than described or are not performed at all. In some cases, steps may include additional features not mentioned below, or further steps may be included.

At 210, the UE 215 may be in a connected state with the network device 205. For example, the UE 215 may have completed a random access procedure with the network device 205, wherefrom the UE 215 may have established an RRC connection.

In some cases, the UE 215 may transition from the connected state to an idle or inactive state. As such, at 220, the network device 205 may transmit a radio resource control (RRC) release message instructing the UE 215 to release the RRC connection with the network device 205. The network device 205 may include, in the RRC release message, PUR configuration information. The PUR configuration information may include an indication of one or more PUR occasions (e.g., time-frequency resources) during which the UE 215 may transmit uplink data to the network device 205.

At 225, upon reception of the RRC release message, the UE 215 may transition out of the connected state, and may prepare for uplink data transmissions on the PUR occasions indicated in the PUR configuration information as provided in the RRC release message.

At 230, the UE 215 may transmit uplink data on one or more PURs during a PUR occasion according to the PUR configuration information. Transmitting small uplink data transmissions during PUR occasions may allow the UE 215 to transmit information to the network device 205 without performing a connection establishment procedure or performing resume protocols, or the like. For instance, the UE 215 may transmit small size sensor data to the network device 205 such as moisture measurements, atmospheric data, or the like, without transmitting a request for connection re-establishment.

At 235, having received the uplink data on the PUR, the network device 205 may transmit a PUR response message to the UE 215. The PUR response message may include one or more of a feedback message (e.g., a layer 1 acknowledgement (ACK) message), a timing advance command, updated PUR configuration information, or an instruction to transition to the connected state (e.g., to re-establish an RRC connection with the network device 205).

The UE 215 may begin monitoring for the PUR response message corresponding to the uplink data, sent at 230, at a time offset after the end of the uplink data transmission. In some cases, the time offset may be a predefined (e.g., legacy) time offset which may span a certain number of subframes or time delay. For example, the UE 215 may begin monitoring for the PUR response message 4 ms after the end of the uplink data transmission at 230.

In some cases, the round trip time (RTT) delay for a signal to reach its destination and a feedback message to be returned may be significantly longer than the legacy time offset. For instance, process flow 200 may be an example of a non-terrestrial network (NTN) deployment where the RTT delay for a signal transmitted between the UE 215 and the network device 205 (e.g., a satellite base station relay in low earth orbit (LEO)) may be large compared to a predefined or legacy time offset. As such, the UE 215 may monitor for the PUR response sent at 235 for an unnecessary amount of time. In particular, the RTT delay corresponding to the process flow 200 may be greater than the legacy time offset may (e.g., 4 ms). In this case, the UE 215 may begin monitoring for the PUR response message, sent at 235, 4 ms (e.g., the legacy time offset) after the end of the uplink data transmission at 230. The UE 215 may wait for some additional time delay because of the longer RTT before receiving the PUR response message. Thus, the UE 215 may monitor for an extended period of time, reducing the benefits of transitioning from the connected state, and increasing power consumption at the UE. In some examples, because of the loner RTT, UE 215 may determine that a PUR response message has failed, or may otherwise stop monitoring for the PUR response before the PUR response is received, resulting in failed transmissions, increased system latency, or the like.

In some examples, the UE 215 may monitor for a PUR response message after every PUR occasion, resulting in additional power expenditures after each PUR occasion. If the RTT delay is particularly long, the number of PUR occasions during a given time interval may be limited. Requiring the UE 215 to wait for PUR response messages after every PUR occasion, especially in wireless communications systems with long RTT delays, may result in slower communications between the UE 215 and the network device 205.

In some examples, wireless communications systems may not support transmission of feedback information (e.g., hybrid automatic repeat request (HARQ) messages) for uplink data transmissions (e.g., HARQ-less transmissions where the success or failure of a transmission is not acknowledged by the receiver on the physical layer). For instance, the UE 215 may transmit small size sensor data during a PUR occasion to the network device 205. If the network device 205 fails to decode the sensor data and the network device 205 refrains from including HARQ feedback from the subsequent PUR response message, the information may be permanently lost. Therefore, monitoring for a PUR response message after every PUR occasion may result in unnecessary power expenditures, but and HARQ-less communications may result in slower communications and decreased system efficiency.

In some examples, as described herein, the UE 215 may identify a configurable time offset for monitoring for PUR response messages, and may not monitor for a PUR response message after every PUR occasion.

In some cases, the UE 215 may begin monitoring for a PUR response message after a time offset following the end of a corresponding uplink data transmission. In some examples, the time offset may be a configurable time offset which may span long RTT delays. For example, the UE 215 may not have to monitor for a PUR response message for an unnecessary amount of time, resulting in less power consumption at the UE 215. The UE 215 may receive, from the network device, an indication of the configurable time offset, or the UE 215 may select the configurable time offset from a set of candidate configurable time offsets, as described in greater detail with reference to FIGS. 3-5.

In some cases, the UE 215 may not monitor for a PUR response message after every PUR occasion. In some examples, the UE 215 may monitor for PUR response message according to a pattern or periodicity corresponding to one or more system parameter values or indicated by the network device 205. In some examples, the UE 215 may dynamically request a PUR response message, or the network device may dynamically indicate a timing for PUR response messages. Such techniques are described in greater detail with reference to FIGS. 6-8.

Figure 3:
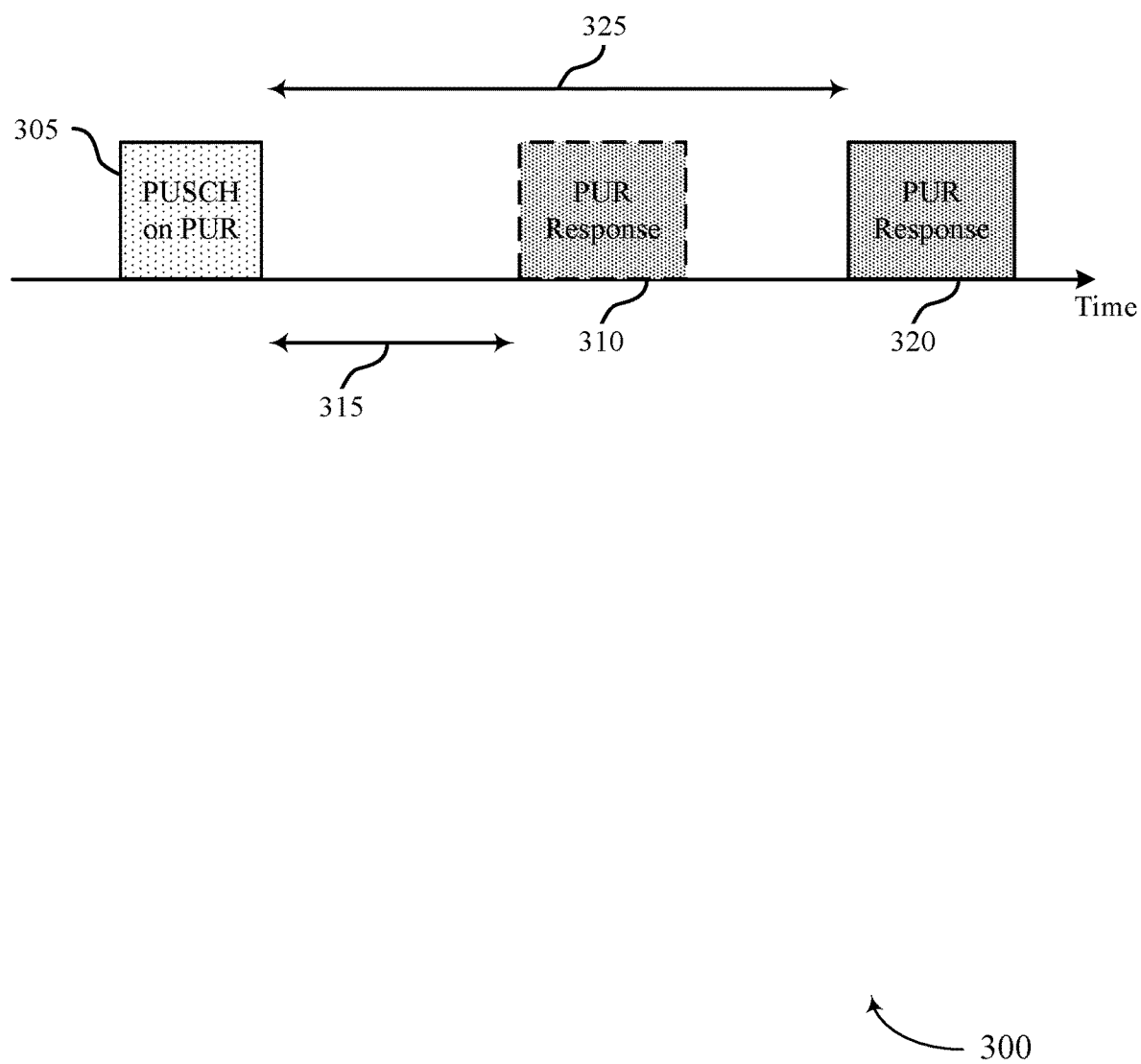
FIG. 3 illustrates an example of a timeline that supports preconfigured uplink resource response signaling in accordance with aspects of the present disclosure.

FIG. 3 illustrates an example of a timeline 300 that supports preconfigured uplink resource response signaling in accordance with aspects of the present disclosure. In some examples, the timeline 300 may implement aspects of the process flow 200 as described with reference to FIG. 2. The timeline 300 shows an example of the sequence of events corresponding to communications using a PUR configuration. For instance, the PUSCH transmission 305 may be an example of uplink data transmitted at 230 or 240 as described with reference to FIG. 2. Moreover, PUR response messages 310 and 320 may be examples of PUR response messages transmitted at 235 or 245 as described with reference to FIG. 2. FIG. 3 is not necessarily shown to scale to allow for clearer illustration and description; time offset 315 and configurable time offset 325 may be relatively smaller (or larger) than shown.

In some cases, a UE may transmit a PUSCH transmission 305 on a PUR during a PUR occasion to a network device. Upon the reception of the PUSCH transmission 305, the network device may transmit PUR response message 310 to the UE. In some examples, the UE may begin monitoring for the PUR response message 310 at a time offset 315 (e.g., legacy time offset) after the end of the PUSCH transmission 305. For instance, the UE may begin monitoring for the PUR response message 310 4 ms after the end of the PUSCH transmission 305.

In some cases, the RTT delay between the UE and the network device may be longer than the legacy time offset 315. For example, the UE may be located far away from a base station, or may perform a handover from a base station that is close to the UE to a base station that is far away from the UE. In some examples, the network device may be part of an NTN where the network device is a satellite in orbit or a terrestrial base station communicating with the UE through the satellite relay in orbit. In such a case, the RTT delay may be significantly longer than an RTT corresponding to a terrestrial network. In such a network, the UE may transmit the PUSCH transmission 305 to the network device. Due to the long RTT delay, the network device may receive the PUSCH transmission 305 and transmit the PUR response message 320 long after legacy time offset 315. The UE may begin monitoring for the PUR response message 320 after legacy time offset 315. However, because of the loner RTT, the UE may monitor for the PUR response message 320 for from the time the legacy time offset 315 expires until PUR response message 320 is successfully received. Thus, the time offset 315 may be too short for a communications system with a long RTT delay, resulting in unnecessary monitoring, increased battery consumption at the UE, missed transmissions, or the like.

In some examples of a wireless communications network, the UE may begin monitoring for PUR response message 320 after a configurable time offset 325 after transmitting PUSCH transmission 305. The configurable time offset 325 may compensate for longer RTT delays such that the UE may not have to monitor for PUR response messages for unnecessarily long periods of time. Using a configurable time offset 325 may allow shorter monitoring times for the UE, resulting in enhanced system efficiency and decreased battery consumption at the UE.

In some cases, the network may configure the configurable time offset 325 in PUR configuration information. In such a case, a network device (e.g., a base station, orbital base station relay, etc.) may provide the PUR configuration information within an RRC release message which may be sent to the UE when the UE switches from a connected state to an idle or inactive mode.

In some cases, the network may configure the configurable time offset 325 in a message other than the PUR configuration information. For instance, the UE may have previously undergone a random access procedure with the network device to establish an RRC connection with a network device. In such a case, the network device may have indicated the configurable time offset 325 in a random access channel (RACH) response message during the random access procedure.

In some cases, the UE may select the configurable time offset 325 from a set of configurable time offset 325 values. The UE may select the configurable time offset 325 based on one or more system parameter values corresponding to the network. The system parameter values may include one or more of an RTT delay, an orbital height of the network device, or an angle of elevation of the network device with reference to the UE.

Techniques for identifying the configurable time offset 325 are described in greater detail with reference to FIG. 4.

Figure 4:
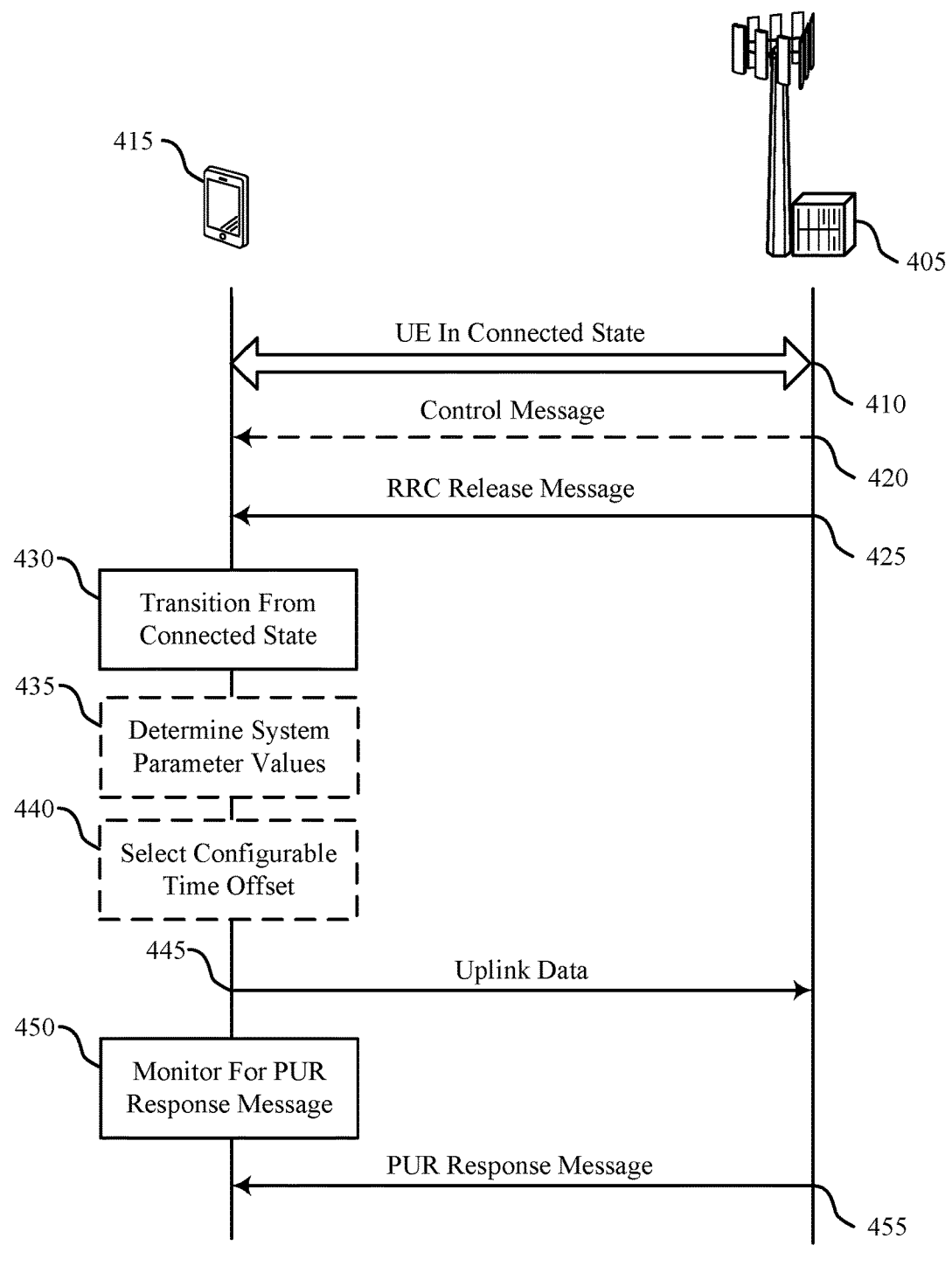
FIG. 4 illustrates an example of a process flow that supports preconfigured uplink resource response signaling in accordance with aspects of the present disclosure.

FIG. 4 illustrates an example of a process flow 400 that supports preconfigured uplink resource response signaling in accordance with aspects of the present disclosure. In some examples, process flow 400 may implement aspects of the process flow 200 and the timeline 300 as described with reference to FIGS. 2 and 3, respectively. The process flow 400 shows an example of communications between a network device 405 and a UE 415 which may be examples of network device 205 and UE 215, respectively, as described with reference to FIG. 2. Network device 405 may be a satellite in an NTN deployment, a terrestrial base station relaying signaling through a satellite in an NTN deployment, a base station as described with reference to FIG. 1, or the like. Alternative examples of the following may be implemented, where some steps are performed in a different order than described or are not performed at all. In some cases, steps may include additional features not mentioned below, or further steps may be included.

At 410, the UE 415 may be in a connected state with the network device 405. For example, the UE 415 may have completed a random access procedure with the network device 405, wherefrom the UE 415 may have established an RRC connection.

In some cases, the UE 415 may transition from the connected state to an idle or inactive state. As such, at 425, the network device 405 may transmit an RRC release message instructing the UE 215 to release the RRC connection with the network device 405. The network device 405 may include, in the RRC release message, PUR configuration information. The PUR configuration information may include an indication of one or more PUR occasions during which the UE 415 may transmit uplink data to the network device 405.

In some examples, as described with reference to FIG. 3, UE 415 may determine when to monitor for a PUR response message after transmitting uplink data using a configurable time offset. In some examples, network device 405 may transmit an indication of the configurable time offset to UE 415. For example, network device 405 may include an indication of the configurable time offset in the RRC release message transmitted at 425. The configurable time offset may be an example of the configurable time offset 325 as described with reference to FIG. 3.

At 430, the UE 415 may receive the RRC release message, and the UE 415 may transition from the connected state based on receiving the RRC release message. The UE 415 may prepare to transmit uplink data to the network device 405 on the PUR during one or more PUR occasions based on the PUR configuration information provided in the RRC release message.

At 445, the UE 415 may transmit uplink data on the PUR to the network device 405 during a PUR occasion. The uplink data may be small size sensor data such as moisture measurements, atmospheric data, etc.

At 450, the UE 415 may begin monitoring for a PUR response message corresponding to the uplink data transmitted at 445. The UE 415 may begin monitoring for the PUR response message after the configurable time offset received in the RRC release message at 425 following the end of the uplink data transmission at 445.

Upon receiving the uplink data, the network device 405 may transmit a PUR response message to the UE 415, at 455. The PUR response message may include one or more of a feedback message (e.g., a layer 1 acknowledgement message), a timing advance command, updated PUR configuration information, or an instruction to transition to the connected state (e.g., to re-establish an RRC connection with the network device 405).

In some cases, the network device 405 may transmit an indication of the configurable time offset to the UE 415 in a different message than the RRC release message. In some examples, at 420, while the UE 415 is in the connected state with the network device 405, the network device 405 may send a control message to the UE 415 to configure one or more communication parameters at the UE 415. In some cases, the control message may be a system information broadcast (SIB) message, a master information broadcast (MIB) message, a remaining minimum system information (RMSI) message, or the like. In some cases, the control message may be an RRC message. In some examples, the control message may include an indication of a configurable time offset for use in another procedure (e.g., a random access channel (RACH) procedure. For instance, the network device 405 may transmit the control message to the UE 415 indicating an offset value to be used after transmitting a random access request message for monitoring for a random access response message. In some examples, UE 415 may utilize the same offset value as the configurable time offset for monitoring for a PUR response message. In some examples, the control message may include an indication of the configurable time offset. In some examples, the network device 405 may transmit the indication of the configurable time offset in a separate message after transmitting the RRC release message at 425 (e.g., in another RRC message, a DCI message, in a PUR response message, or the like).

In some cases, the UE 415 may transition from the connected state to an idle or inactive state. As such, at 425, the network device 405 may transmit a radio RRC release message instructing the UE 415 to release the RRC connection with the network device 405. The network device 405 may include, in the RRC release message, PUR configuration information. The PUR configuration information may include an indication of one or more PUR occasions during which the UE 415 may transmit uplink data to the network device 405.

At 430, the UE 415 may receive the RRC release message, and the UE 415 may transition from the connected state based on receiving the RRC release message. At 445, the UE 415 may transmit uplink data during a PUR occasion. At 450, as described above, the UE 415 may monitor for a PUR response message after the configurable time offset received in the control message (e.g., at 420). At 455, the UE 415 may receive a PUR response message based on the monitoring.

In some cases, the UE 415 may select the configurable time offset from a set of configurable time offsets based on one or more system parameter values corresponding to the network. The set of configurable time offsets may be pre-defined at the UE 415 (e.g., in one or more standard documents) or received from the network device 405 in a control message at 420, or indicated in an RRC message (e.g., the RRC release message at 425 or another RRC message). In some examples, UE 415 may be configured with a table including the set of candidate configurable time offsets. Each configurable time offset may correspond to one or more system parameter values. In some examples, the one or more system parameter values may include an RTT delay between the UE 415 and the network device 405, an orbital height of the network device 405, and an angle of elevation of the network device 405 with reference to the UE 415. In some examples, at 420, the network device 405 may include one or more system parameter values in the control message as described herein. In other examples, at 425, the network device 405 may include one or more system parameter values in the RRC release message as described herein.

Upon receiving the RRC release message, the UE 415, at 430, may transition from the connected state.

At 435, the UE 415 may determine the one or more system parameter values based on the control message at 420, the RRC release message at 425, autonomous determination, or the like. For instance, UE 415 may determine an RTT for the system based on signaling with the base station, based on information included in the RRC release message, or the like.

Once the UE 415 determines the one or more system parameter values at 435, the UE 415 may select the appropriate configurable time offset of the set of configurable time offsets based on the determined one or more system parameter values. Likewise, the network device 405 may select the same configurable time offset as the system parameter values and set of configurable time offsets may be known to both the network device 405 and the UE 415. The configurable time offset may be selected to increase efficiency and power expenditures at the UE 415. For example, if the RTT is greater, then UE 415 may select a correspondingly larger configurable time offset. If the RTT is smaller, then the UE 415 may select a correspondingly smaller configurable time offset. Thus, the UE may avoid waking up too early and monitoring for too long, and may similarly avoid waking up too late and missing the PUR response message. Having selected the configurable time offset, at 445, the UE 415 may transmit the uplink data to the network device 405 during a PUR occasion. After the configurable time offset, at 450 the UE 415 may begin to monitor for the PUR response message. AT 455, the UE 415 may receive the PUR response message based on the monitoring.

In some cases, the configurable time offset may be used as an absolute value corresponding to the total time between the end of an uplink transmission from the UE 415 and initiating monitoring for a corresponding PUR response message. In other cases, the configurable time offset may be a positive offset added to a predefined or base time offset (e.g., the legacy time offset) such that the combined duration of the configured time offset and the base time offset spans the total time between the end of an uplink transmission from the UE 415 and initiating monitoring for a corresponding PUR response message. The configurable time offset itself is described in greater detail with reference to FIG. 5.

Figure 5:
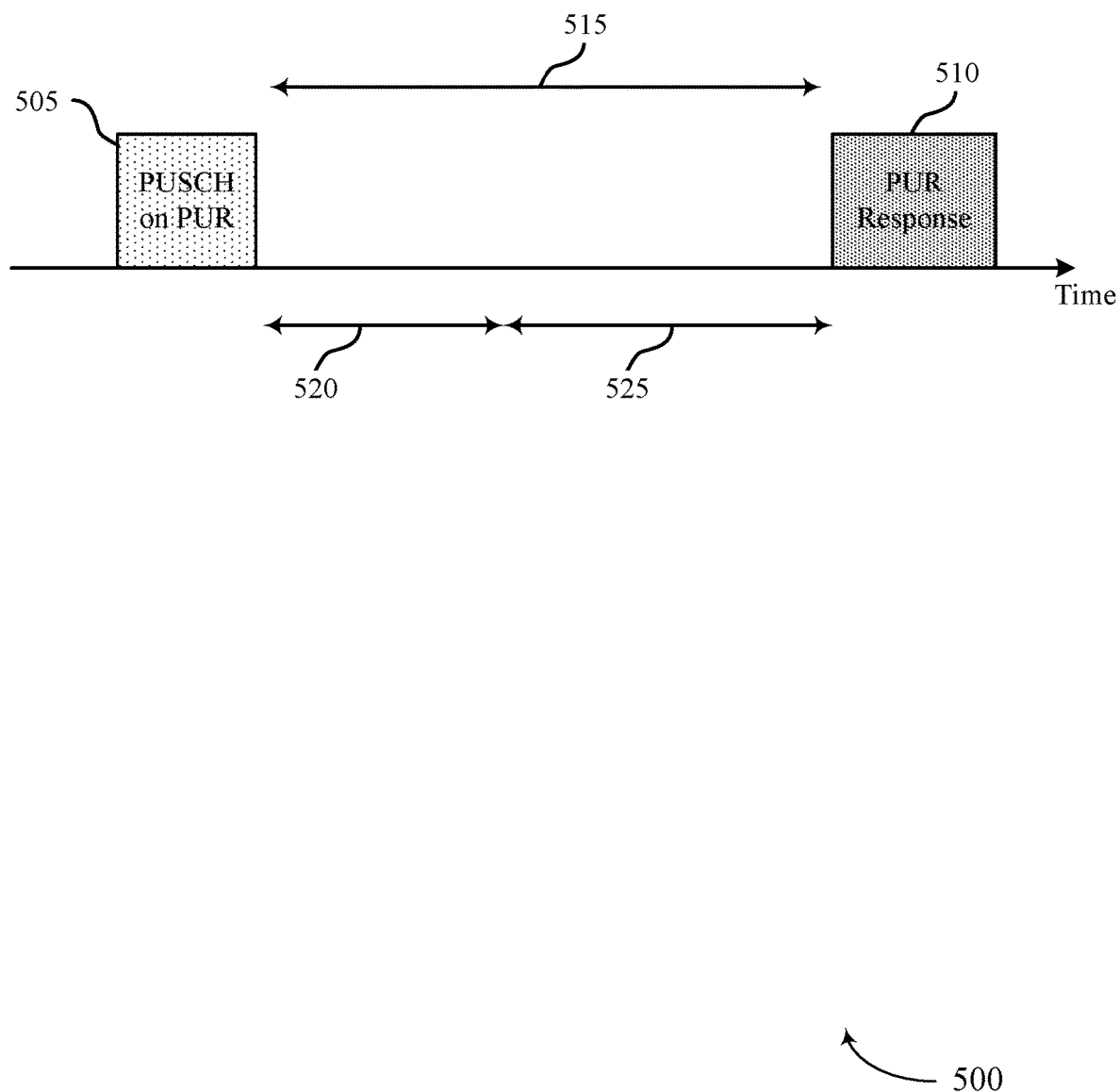
FIG. 5 illustrates an example of a timeline that supports preconfigured uplink resource response signaling in accordance with aspects of the present disclosure.

FIG. 5 illustrates an example of a timeline 500 that supports preconfigured uplink resource response signaling in accordance with aspects of the present disclosure. In some examples, the timeline 500 may implement aspects of the process flow 400 as described with reference to FIG. 4. The timeline 500 shows an example of the sequence of events corresponding to communications using a configurable time offset when communicating on a PUR. For instance, the PUSCH transmission 505 may be an example of uplink data transmitted at 445 as described with reference to FIG. 4. Moreover, PUR response message 510 may be an example of PUR response message transmitted at 455 as described with reference to FIG. 4. FIG. 5 is not necessarily shown to scale to allow for clearer illustration and description; configurable time offsets 515 and 525 may be relatively smaller (or larger) than shown.

In some cases, a UE may transmit a PUSCH transmission 505 on a PUR to a network device (e.g., a base station, satellite, etc.). Upon the reception of the PUSCH transmission 505, the network device may transmit PUR response message 510, to the UE. In some cases, the UE may begin monitoring for the PUR response at configurable time offset 515 after the end of the PUSCH transmission 505. In such cases, the configurable time offset 515 may be the absolute value of the time between the end of the PUSCH transmission and initiating monitoring for the PUR response message 510 at the UE. In some examples, the configurable time offset 515 may correspond to the RTT delay between the UE and the network device.

In some cases, the configurable time offset 525 may be a positive offset added to the end of a predefined or base (e.g., legacy) time offset 520 where the sum of the configurable time offset 525 and the predefined time offset 520 may be the total time between the end of the PUSCH transmission 505 and initiating monitoring for the PUR response message 510 at the UE. In some examples, the configurable time offset 525 and the base time offset 520 may correspond to the RTT delay between the UE and the network device.

The UE may identify the configurable time offset based on signaling from the network device (e.g., in an RRC release message, a control message, or the like). In some examples, the UE may select the configurable time offset from a set of configurable time offsets. In any case, the configurable time offset may be a configurable time offset 525 to be added to a base time offset 520, or may be an absolute value configurable time offset 515.

In some examples, the UE may not be monitor for a PUR response message 510 after every PUSCH transmission 505. In some cases, the UE may monitor for PUR response messages 510 according to a pattern or periodicity. PUR response monitoring schemes are described in greater detail as described with reference to FIG. 6.

Figure 6:
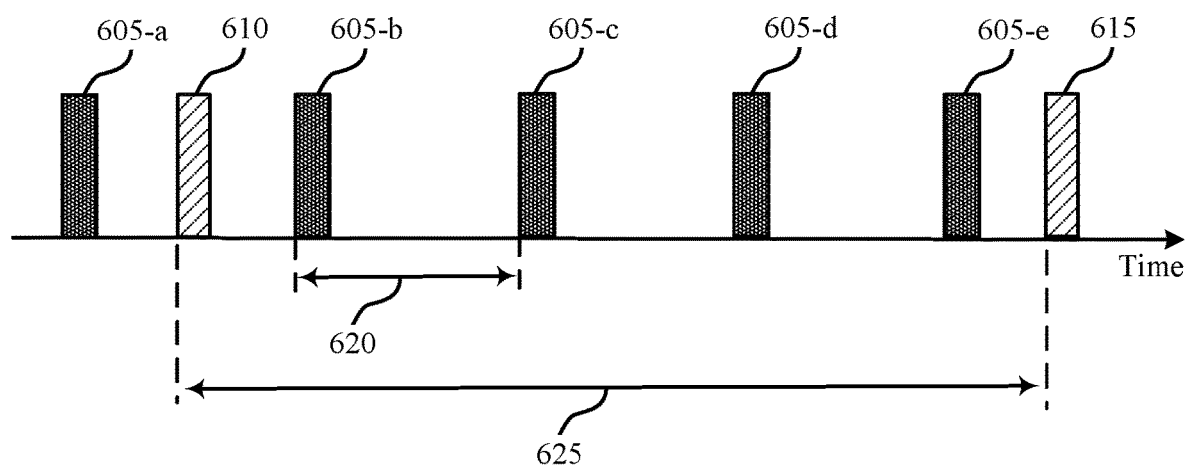
FIG. 6 illustrates an example of a timeline that supports preconfigured uplink resource response signaling in accordance with aspects of the present disclosure.

FIG. 6 illustrates an example of a timeline 600 that supports preconfigured uplink resource response signaling in accordance with aspects of the present disclosure. In some examples, the timeline 600 may implement aspects of the timeline 500 as described with reference to FIG. 5. For example, a UE and a network device may communicate with each other in accordance with timeline 600, and the UE and the network device may be examples of corresponding devices described with reference to FIGS. 1-5. The timeline 600 shows an example of the sequence of communications corresponding to communications using a configurable time offset when communicating on a PUR. For instance, a UE may transmit, to a network device, one or more PUSCH transmissions 605 which may be examples of PUSCH transmission 505 as described with reference to FIG. 5. Moreover, PUR response messages 610 and 615 may be examples of PUR response message 510 as described with reference to FIG. 5. FIG. 6 is not necessarily shown to scale to allow for clearer illustration and description; PUSCH transmissions 605, PUR response messages 610 and 615, and periodicities 620 and 625 may be relatively smaller (or larger) than shown.

PUR response messages may include timing advance information for a UE. The timing advance information may allow the UE to maintain an uplink timing synchronization with a network device (e.g., a base station, a satellite, or the like). Therefore, PUR response messages may be crucial for maintaining a communication link between the UE and the network device. However, monitoring for a PUR response message after every PUR occasion may be inefficient and may result in unnecessary power expenditures at the UE and delays in communication (e.g., where an RTT is large). Thus, enhanced PUR response monitoring schemes which may preserve battery power at the UE and improve system efficiency may be desired. Such schemes are described herein.

In some cases, a UE may monitor for PUR response messages after one or more PUSCH transmissions 605. The UE may transmit PUSCH transmission 605-*a* during a first PUR occasion and the UE may begin monitoring for a PUR response message 610 after a configurable time offset following the end of the PUSCH transmission 605-*a*. The configurable time offset may be an example of the configurable time offset 515 or 525 as described with reference to FIG. 5.

In some cases, the UE may not monitor for PUR response message after every PUR occasion. In such a case, the UE may monitor PUR response message according to a PUR response periodicity 625. In some examples, a network device (e.g., a base station, a satellite, or the like) may configure and indicate the PUR response periodicity 625, to the UE. The network device may indicate the PUR response periodicity in a control message, an RRC (or RRC release) message, a PUR response message, or the like. In some examples, the network device may configure the PUR response periodicity based on a number of PUR occasions. For instance, the network device may configure the PUR response periodicity 625 where the UE may monitor for PUR response messages once every four PUR occasions. In such a case, the UE may transmit PUSCH transmissions 605-*b*, 605-*c*, 605-*d*, and 605-*e*, during a second, third, fourth, and fifth PUR occasion respectively. After a configurable time offset following the end of the PUSCH transmission 605-*e*, the UE may begin monitoring for PUR response message 615. In some examples the network device may configure the PUR response periodicity 625 based on a timer. In such a case, the UE may receive PUR response message 610. The UE may wait for a timer to expire before initiating monitoring for PUR response message 615, the timer corresponding to the PUR response periodicity 625. During the time interval between PUR response messages 615 and 610, the UE may transmit one or more PUSCH transmissions 605 such as PUSCH transmissions 605-*b*, 605-*c*, 605-*d*, and 605-*e* during one or more PUR occasions. Likewise, the network device may not transmit a PUR response message to the UE after every PUR occasion. As such, the network device may transmit PUR response messages to the UE according to the PUR response pattern or PUR response periodicity 625.

In some examples, the UE may select a PUR response periodicity 625 from a set of periodicities. In some cases, the set of periodicities may be predefined (e.g., in one or more standard documents) at the UE. The UE may select the PUR response periodicity 625 based on determining one or more system parameter values. The system parameter values may include one or more of a maximum RTT delay for communications between the UE and the network device, an orbital height of the network device, or an angle of elevation of the network device with reference to the UE. The UE may determine the one or more system parameter values based on a received control message, a received RRC message, autonomous determination, or the like. For instance, the UE may select a PUR response periodicity 625 based on determining the RTT delay for communications between the UE and the network device. In some cases, the UE may determine the RTT delay based on previous signaling between the UE and the network device such as an RRC message.

In some examples, the network device may dynamically indicate, to the UE, a next instance when the UE may begin monitoring for a PUR response message. In some cases, the network device may indicate the next instance within a PUR response message. For example, the UE may transmit PUSCH transmission 605-*a* during a first PUR occasion. Upon receiving the PUSCH transmission 605-*a*, the network device may transmit PUR response message 610, to the UE, including an indication of the next instance when the UE may begin monitoring for PUR response message 615. Upon reception of the PUR response message 610, the UE may begin monitoring for the PUR response message 615 according to the indication in the PUR response message 610. Additionally, following the PUR response message 610 and before monitoring for PUR response message 615, the UE may transmit one or more PUSCH transmissions 605 during one or more PUR occasions. In some cases, the network device may provide, within PUR response message 615, feedback information (e.g., ACK messages) corresponding to the one or more PUSCH transmissions 605 received in the time between transmitting the two PUR response messages 610 and 615.

In some examples, the UE may transmit a request for the network device to transmit a PUR response. In some cases, the UE may transmit the request for the PUR response in a PUSCH transmission 605. For example, the UE may transmit PUSCH transmission 605-*a* to the network device including a request for the network device to transmit PUR response message 610. The UE may start monitoring for the PUR response message 610 after a configurable time offset following the end of PUSCH transmission 605-*a*. The UE may receive PUR response message 610 and continue subsequent communications on the PURs. In another example, the UE may request that the network device transmit a PUR response message corresponding to one or more PUSCH transmissions 605. For instance, the UE may transmit PUSCH transmission 605-*b* to the network device including a request for the network device to transmit PUR response message 615, where the PUR response should correspond to a number of following PUSCH transmissions 605 (e.g., PUSCH transmissions 605-*c*, 605-*d*, and 605-*e*). The UE may begin monitoring for PUR response message 615 after a configurable time offset following the end of PUSCH transmission 605-*e*. It may be appreciated by one skilled in the art that the UE may transmit the PUR response request during any PUSCH transmission 605 for a PUR response message corresponding to any one or more PUSCH transmissions 605 in a given time interval.

Techniques for identifying the PUR response scheme are described in greater detail with reference to FIG. 7.

Figure 7:
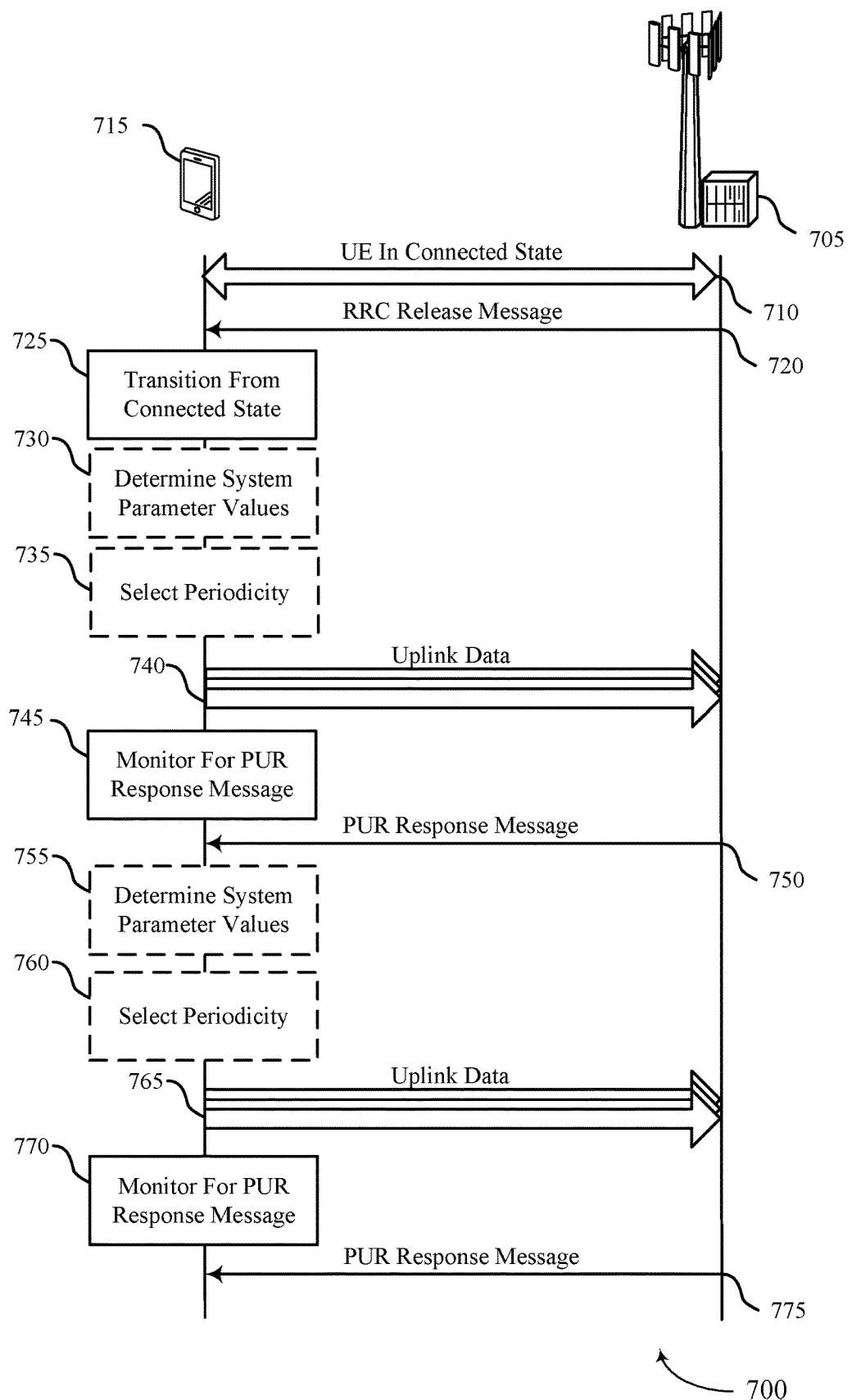
FIG. 7 illustrates an example of a process flow that supports preconfigured uplink resource response signaling in accordance with aspects of the present disclosure.

FIG. 7 illustrates an example of a process flow 700 that supports preconfigured uplink resource response signaling in accordance with aspects of the present disclosure. In some examples, process flow 700 may implement aspects of the process flow 400 and the timeline 600 as described with reference to FIGS. 4 and 6, respectively. The process flow 700 shows an example of communications between a network device 705 and a UE 715 which may be examples of corresponding devices as described with reference to FIGS. 1-6. Network device 705 may be a satellite in an NTN deployment, a base station relaying signaling through a satellite in an NTN deployment, a base station as described with reference to FIG. 1, or the like. Alternative examples of the following may be implemented, where some steps are performed in a different order than described or are not performed at all. In some cases, steps may include additional features not mentioned below, or further steps may be included.

At 710, the UE 715 may operate in a connected state with the network device 705. For example, the UE 715 may have completed a random access procedure with the network device 705, wherefrom the UE 715 may have established an RRC connection.

In some cases, the UE 715 may transition from the connected state to an idle or inactive state. As such, at 720, the network device 705 may transmit an RRC release message instructing the UE 715 to release the RRC connection with the network device 705. The network device 705 may include, in the RRC release message, PUR configuration information. The PUR configuration information may include an indication of one or more PUR occasions during which the UE 715 may transmit uplink data to the network device 705.

In some examples, as described with reference to FIG. 6, UE 715 may determine when to monitor for a PUR response message after transmitting uplink data during the one or more PUR occasions using a PUR response periodicity. In some examples, network device 705 may transmit an indication of the PUR response periodicity to UE 715 in the RRC release message transmitted at 720. Alternatively, the network device 705 may include the indication of the next PUR response instance in another control message (not shown). For example, the network device 705 may include the PUR response periodicity in a separate RRC message, a control message, or the like. In some examples, the network device 705 may transmit such a control message to the UE 715 while the UE 715 is in the connected state. The PUR response periodicity may be an example of the PUR response periodicity 625 as described with reference to FIG. 6.

At 725, having received the RRC release message at 720, the UE 715 may transition from the connected state based on receiving the RRC release message. The UE 715 may prepare to transmit uplink data to the network device 705 on the PUR during one or more PUR occasions based on the PUR configuration information provided in the RRC release message.

At 740, the UE 715 may transmit uplink data on a PUR to the network device 705 during one or more PUR occasions. The uplink data may be small size sensor data such as moisture measurements, atmospheric data, etc.

At 745, the UE 715 may begin monitoring for a PUR response message corresponding to the uplink data transmitted at 740. The UE 715 may begin monitoring for a PUR response message according to the PUR response periodicity after a configurable time offset following the end of the uplink data transmissions at 740. In some cases, the PUR response periodicity may be based on a number of PUR occasions. For instance, the UE 715 may begin monitoring for the PUR response message corresponding to uplink data transmitted at 740 after four consecutive PUR occasions. In other cases, the PUR response periodicity may be based on a timer. For instance, the UE 715 may begin monitoring for the PUR response message corresponding to uplink data transmitted at 740 after a certain time period (e.g., N minutes, where N is a number indicated by the network device defining the PUR response periodicity timer).

At 750, upon receiving the uplink data at 740, the network device 705 may transmit a PUR response message, based on a PUR response periodicity, to the UE 715. The PUR response message may include one or more of a feedback message (e.g., a layer 1 ACK message), a timing advance command, updated PUR configuration information, or an instruction to transition to the connected state (e.g., to re-establish an RRC connection with the network device 405). In some cases, the PUR response message may include feedback information (e.g., ACK messages) for uplink data transmitted during one or more PUR occasions. In some examples, the PUR response message may include feedback information for multiple PUR occasions, as described in greater detail with reference to FIG. 8.

At 765, the UE 715 may transmit another set of one or more uplink data transmissions on corresponding PUR occasions, according to the configured periodicity. At 770, having transmitted multiple uplink data transmissions without monitoring for a PUR response message, the UE 715 may monitor for a PUR response message after the configured periodicity (e.g., after the configured number of PUR occasions or time delay). At 775, based on the monitoring, the UE 715 may receive the PUR response message.

In some cases, the network device 705 may update a PUR response periodicity for the UE 715 to monitor for PUR response messages. In such a case, the network device 705 may include, in the current PUR response message, an updated PUR response periodicity (e.g., the new PUR response periodicity).

Upon receiving the PUR response message, the UE 715 may prepare to monitor for subsequent PUR response messages based on the updated PUR response periodicity as indicated in the PUR response message received at 750.

At 765, the UE 715 may transmit uplink data on the PUR to the network device 705 during one or more PUR occasions according to the updated periodicity.

At 770, the UE 715 may begin monitoring for a PUR response message corresponding to the uplink transmissions sent at 765. The UE 715 may begin monitoring for the PUR response message according to the updated PUR response periodicity received in the PUR response message at 750 after a configurable time offset following the end of the uplink data transmissions at 765.

At 775, the UE 715 may receive the PUR response message corresponding to the uplink data transmitted during one or more PUR occasions at 765.

In some cases, the UE 715 may select a PUR response periodicity from a set of predefined periodicities (e.g., a set of candidate periodicities defined by one or more standard documents, configured by the network device 705, preconfigured at the UE 715, or the like).

At 730, upon transitioning from the connected state at 725, the UE 715 may determine one or more system parameter values. In some examples, the system parameter values may be associated with an NTN deployment of a wireless communications system. For example, the network device 705 may be a satellite in a LEO and the UE 715 may communicate with the network device 705. In such a deployment, the one or more system parameters may include a maximum RTT delay for communications between the UE 715 and the network device 705, an orbital height of the network device 705, an angle of elevation of the network device 705 with reference to the UE 715, or any combination thereof. In some examples, the UE 715 may determine the one or more parameter values based on signaling from the network device 705. Such signaling may include a control message (e.g., a RACH message), an RRC (or RRC release) message, a PUR response message, or the like. For instance, the UE 715 may determine the RTT delay of the communications between the UE 715 and the network device 705 based on the time delay between transmitting a message to the network device and receiving a corresponding (e.g., feedback) message. In other examples, the UE 715 may autonomously determine the one or more system parameter values, or may receive an explicit message including the system parameter values.

At 735, the UE 715 may select the periodicity from a set of predefined periodicities based on determining the one or more system parameter values. Each system parameter value may be associated with one of the candidate periodicities. In some examples, such associations may be defined in a standardized or configured table. In such examples, the UE 715 may transmit uplink data at 740, without monitoring for a PUR response message after each data transmission, according to the selected periodicity. At 745, the UE 715 may monitor for a PUR response message, which it may receive at 750 based on the monitoring. In some examples, one or more system parameters may change over time (e.g., due to UE mobility, handover procedures between network devices, spatial transmission paths, beam selection, or the like. In such examples, the UE may update its periodicity based on the updated parameters. For example, at 755, the UE 715 may determine new or updated system parameter values (e.g., a new RTT, a new orbital height or angle of elevation, or the like). Based on the updated system parameter values, the UE 715 may select an updated periodicity for monitoring for PUR response messages. At 765, the UE 715 may transmit uplink data. At 770, according to the updated periodicity and after transmitting multiple uplink data transmissions, the UE 715 may monitor for a PUR response message, which it may receive at 775.

In some cases, the network device 705 may dynamically indicate the next instance during which the UE 715 should monitor for a next PUR response message.

Having transitioned to the connected state at 725, the UE 715 may transmit one or more uplink data transmissions at 740. In some examples, the UE 715 may transmit a single data transmission on a first PUR occasion, and may monitor for a PUR response message at 745 after the single data transmission. AT 750, the UE 715 may receive a first PUR response message, which may include an indication of next instance (e.g., a timing or PUR occasion) when the UE 715 is to monitor for a next PUR response message. For instance, the network device 705 may include a number of PUR occasions or a time delay after the current PUR response message after which the UE 715 should begin monitoring for the next PUR response message. In such a case, the PUR response message may include a field dedicated to an indication of the next PUR response message timing.

At 765, the UE 715 may transmit uplink data on the PUR to the network device 705 during one or more PUR occasions.

At 770, the UE 715 may begin monitoring for a PUR response message corresponding to the uplink data transmitted at 765. The UE 715 may begin monitoring for the PUR response message, according to the next PUR response indication received in the PUR response message at 750.

At 775, the UE 715 may receive the PUR response message corresponding to the uplink data transmitted during one or more PUR occasions at 765.

In some cases, the UE 715 may transmit a request for the network device 705 to transmit a PUR response message.

The network may transmit PUR response messages in response to such explicit requests, and may otherwise refrain from transmitting PUR response messages after other PUR occasions.

At 740, the UE 715 may transmit one or more uplink data transmissions to the network device 705 on PURs during one or more PUR occasions. In some examples, the UE 715 may include a request for the base station to transmit a PUR response message corresponding to the uplink data transmitted at 740. For instance, during a first PUR occasion, the UE 715 may transmit uplink data to the network device 705. A first uplink data transmission may not include a request for a PUR response message, and the UE 715 may not monitor for a PUR response message after transmitting the first uplink data transmission. The UE 715 may include, within a second uplink data transmission, a request for the network device 705 to transmit a PUR response message corresponding to the uplink data transmitted during the current, and optionally, one or more previous, PUR occasions. In such a case, the UE 715 may include the PUR response message request in an dedicated field in the uplink data. It may be appreciated by one skilled in the art that the UE 715 may include the PUR response request during any PUR occasion for the network device 705 to transmit a response message corresponding to uplink data transmitted during any one or more PUR occasions.

At 750, upon receiving the uplink data at 740, the network device 705 may transmit a PUR response message, to the UE 715, based on the PUR response request included in the uplink data.

The techniques described above may allow the UE 715 to refrain from monitoring for a PUR response message after every PUR occasion. Such techniques may provide for the UE to reduce active monitoring time, preserve battery power, and improve overall system function.

In some examples, a PUR response message may include feedback information for multiple previous PUR occasions, as described in greater detail with reference to FIG. 8.

Figure 8:
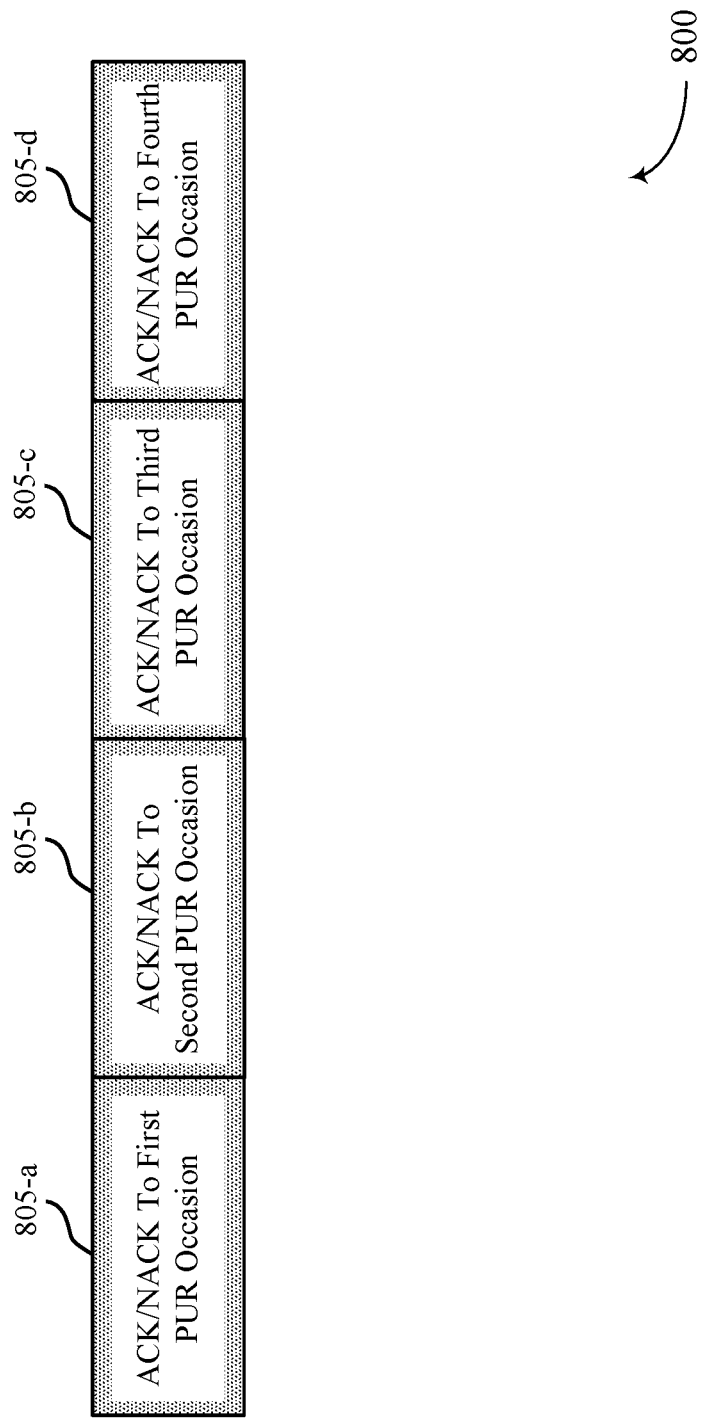
FIG. 8 illustrates an example of a preconfigured uplink resource (PUR) response message that supports preconfigured uplink resource response signaling in accordance with aspects of the present disclosure.

FIG. 8 illustrates an example of a feedback message 800 that supports preconfigured uplink resource response signaling in accordance with aspects of the present disclosure. In some examples, the feedback message 800 may implement aspects of the process flow 700 as described with reference to FIG. 7. The feedback message 800 shows an example of the feedback message within a given PUR response message such as PUR response message sent at 750 as described with reference to FIG. 7.

PUR response messages may include HARQ feedback for uplink data transmitted, by a UE, during one or more PUR occasions. In such a case, a network device may structure the HARQ feedback within a PUR response message such that the HARQ feedback maps to the one or more previous PUR occasions. For instance, the UE may transmit PUSCH transmissions 605-*b*, 605-*c*, 605-*d*, and 605-*e* during a first, second, third, and fourth PUR occasion as described with reference to FIG. 6. As such, the network device may transmit a PUR response message corresponding to the PUSCH transmissions 605, wherein the feedback message 800 includes an ACK/NACK to the first PUR occasion 805-*a*, a ACK/NACK to the second PUR occasion 805-*b*, a ACK/NACK to the third PUR occasion 805-*c*, and an ACK/NACK to the fourth PUR occasion 805-*d*.

The structure of feedback message 800 may allow for the UE to not monitor for a PUR response message after every PUR occasion without losing crucial decoding information (e.g., ACK/NACK messages).

Figure 9:
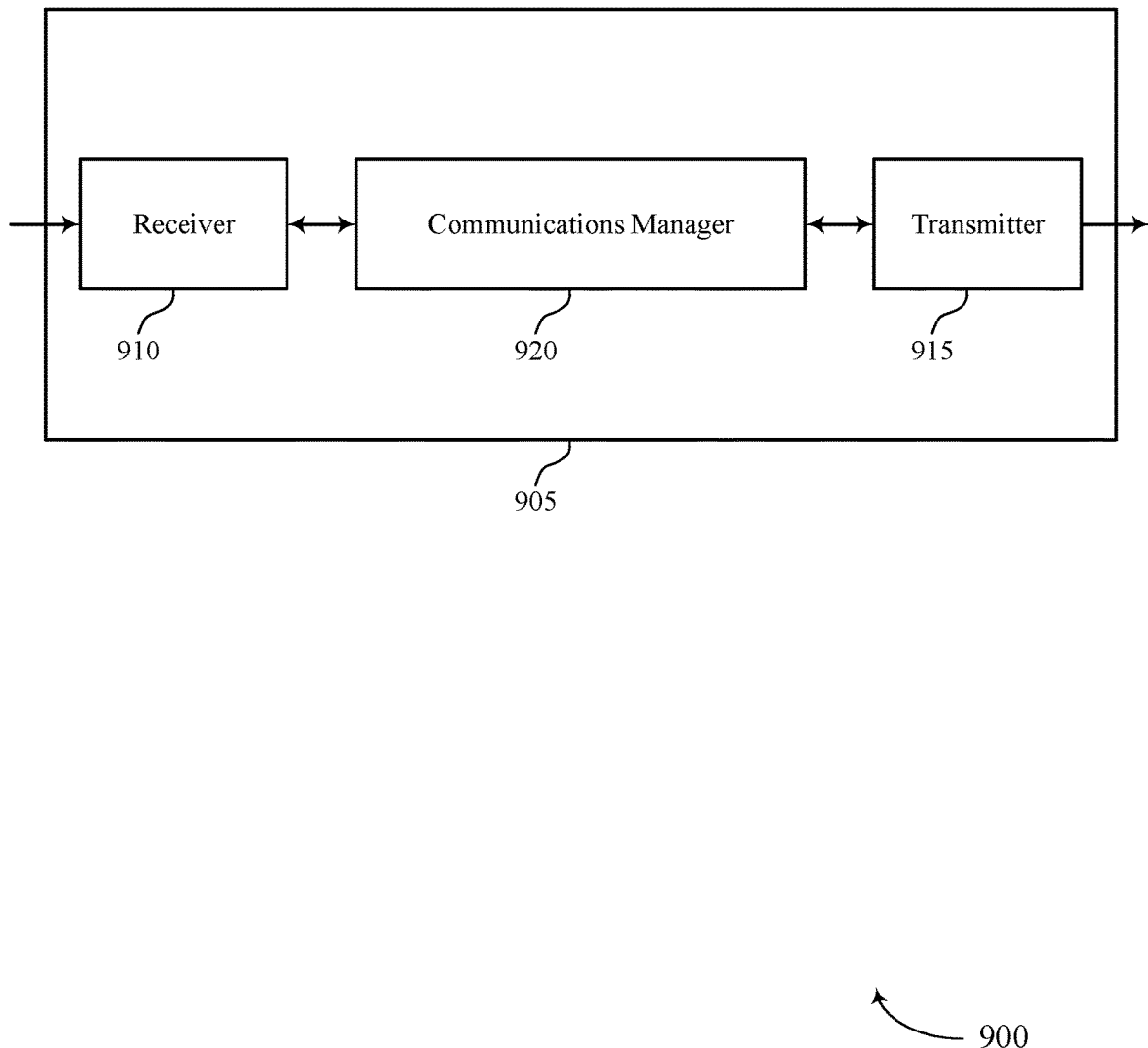
FIGS. 9 and 10 show block diagrams of devices that support preconfigured uplink resource response signaling in accordance with aspects of the present disclosure.

FIG. 9 shows a block diagram 900 of a device 905 that supports preconfigured uplink resource response signaling in accordance with aspects of the present disclosure. The device 905 may be an example of aspects of a UE 115 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to preconfigured uplink resource response signaling). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to preconfigured uplink resource response signaling). In some examples, the transmitter 915 may be co-located with a receiver 910 in a transceiver module. The transmitter 915 may utilize a single antenna or a set of multiple antennas.

The communications manager 920, the receiver 910, the transmitter 915, or various combinations thereof or various components thereof may be examples of means for performing various aspects of preconfigured uplink resource response signaling as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 920 may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communications at a UE in accordance with examples as disclosed herein. For example, the communications manager 920 may be configured as or otherwise support a means for receiving preconfigured uplink resource configuration information from a network device while the UE is in a connected state. The communications manager 920 may be configured as or otherwise support a means for transitioning from the connected state. The communications manager 920 may be configured as or otherwise support a means for transmitting, to the network device, a data transmission during a preconfigured uplink resource occasion in accordance with the preconfigured uplink resource configuration information and while the UE is outside of the connected state. The communications manager 920 may be configured as or otherwise support a means for monitoring for a preconfigured uplink resource response message from the network device after a configurable time offset triggered by the data transmission.

Additionally, or alternatively, the communications manager 920 may support wireless communications at a UE in accordance with examples as disclosed herein. For example, the communications manager 920 may be configured as or otherwise support a means for receiving preconfigured uplink resource configuration information from a network device while the UE is in a connected state. The communications manager 920 may be configured as or otherwise support a means for transitioning from the connected state. The communications manager 920 may be configured as or otherwise support a means for transmitting, to the network device, a set of multiple data transmissions during a respective set of multiple preconfigured uplink resource occasions in accordance with the preconfigured uplink resource configuration information and while the UE is outside of the connected state. The communications manager 920 may be configured as or otherwise support a means for monitoring for one or more preconfigured uplink resource response messages from the network device, where a number of the one or more preconfigured uplink resource response messages is less than the set of multiple data transmissions transmitted by the UE.

By including or configuring the communications manager 920 in accordance with examples as described herein, the device 905 (e.g., a processor controlling or otherwise coupled to the receiver 910, the transmitter 915, the communications manager 920, or a combination thereof) may support techniques for PUR communications using a configurable time offset, and a variable timing for PUR response message signaling, resulting in more efficient use of computational resources, increased battery life, efficient use of available time-frequency resources, or the like.

Figure 10:
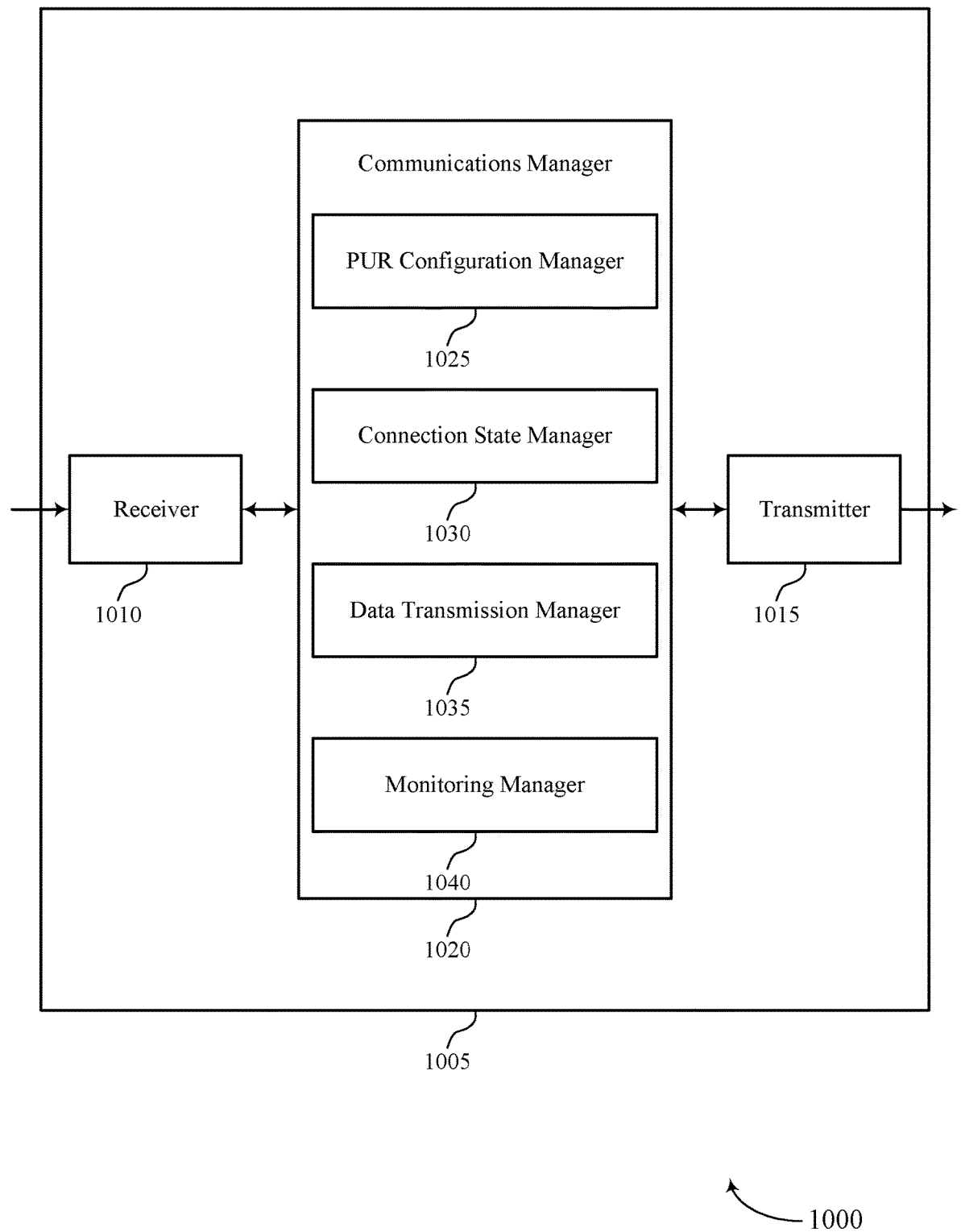

FIG. 10 shows a block diagram 1000 of a device 1005 that supports preconfigured uplink resource response signaling in accordance with aspects of the present disclosure. The device 1005 may be an example of aspects of a device 905 or a UE 115 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to preconfigured uplink resource response signaling). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to preconfigured uplink resource response signaling). In some examples, the transmitter 1015 may be co-located with a receiver 1010 in a transceiver module. The transmitter 1015 may utilize a single antenna or a set of multiple antennas.

The device 1005, or various components thereof, may be an example of means for performing various aspects of preconfigured uplink resource response signaling as described herein. For example, the communications manager 1020 may include a PUR configuration manager 1025, a connection state manager 1030, a data transmission manager 1035, a monitoring manager 1040, or any combination thereof. The communications manager 1020 may be an example of aspects of a communications manager 920 as described herein. In some examples, the communications manager 1020, or various components thereof, may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communications at a UE in accordance with examples as disclosed herein. The PUR configuration manager 1025 may be configured as or otherwise support a means for receiving preconfigured uplink resource configuration information from a network device while the UE is in a connected state. The connection state manager 1030 may be configured as or otherwise support a means for transitioning from the connected state. The data transmission manager 1035 may be configured as or otherwise support a means for transmitting, to the network device, a data transmission during a preconfigured uplink resource occasion in accordance with the preconfigured uplink resource configuration information and while the UE is outside of the connected state. The monitoring manager 1040 may be configured as or otherwise support a means for monitoring for a preconfigured uplink resource response message from the network device after a configurable time offset triggered by the data transmission.

Additionally, or alternatively, the communications manager 1020 may support wireless communications at a UE in accordance with examples as disclosed herein. The PUR configuration manager 1025 may be configured as or otherwise support a means for receiving preconfigured uplink resource configuration information from a network device while the UE is in a connected state. The connection state manager 1030 may be configured as or otherwise support a means for transitioning from the connected state. The data transmission manager 1035 may be configured as or otherwise support a means for transmitting, to the network device, a set of multiple data transmissions during a respective set of multiple preconfigured uplink resource occasions in accordance with the preconfigured uplink resource configuration information and while the UE is outside of the connected state. The monitoring manager 1040 may be configured as or otherwise support a means for monitoring for one or more preconfigured uplink resource response messages from the network device, where a number of the one or more preconfigured uplink resource response messages is less than the set of multiple data transmissions transmitted by the UE.

Figure 11:
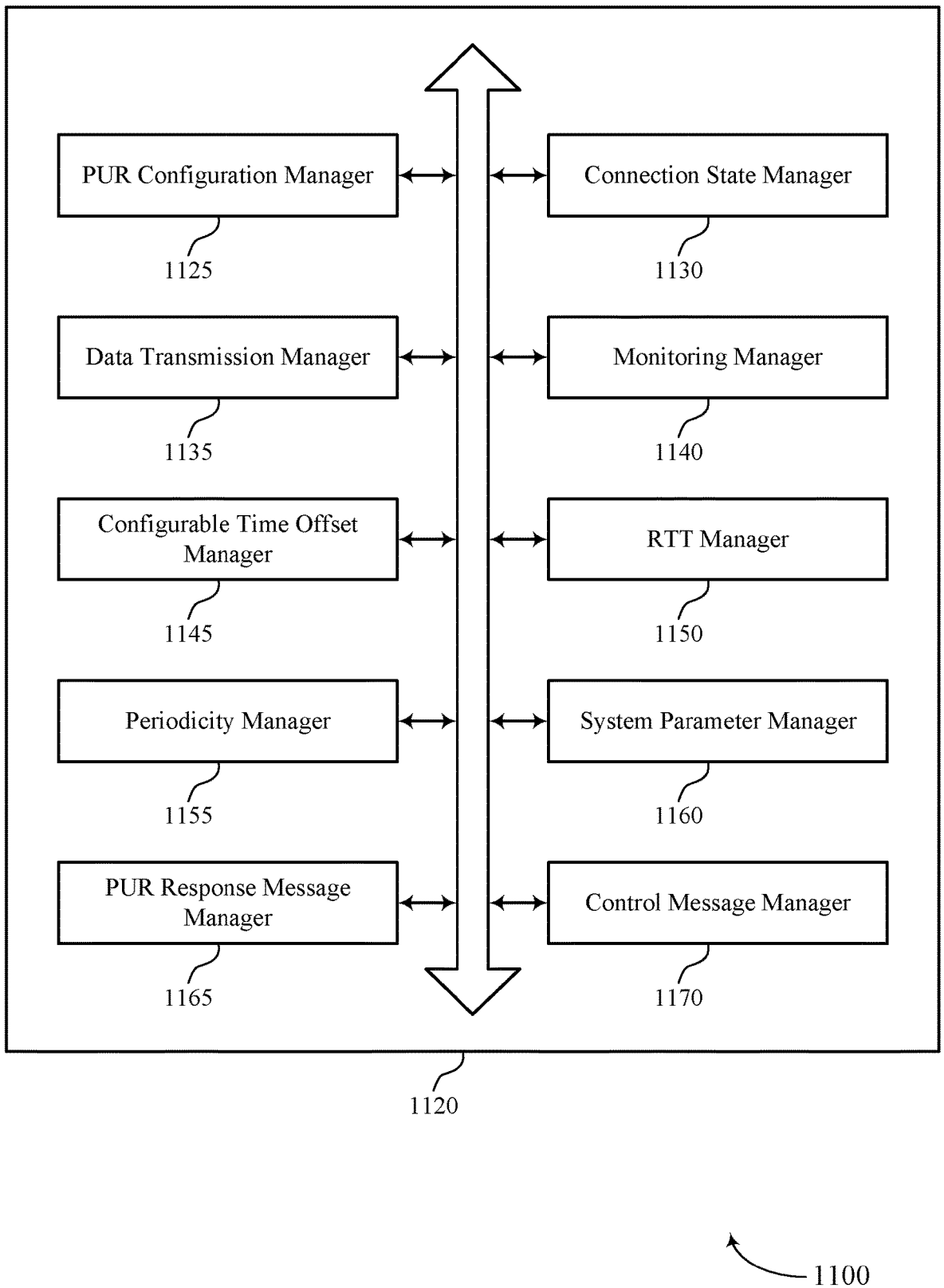
FIG. 11 shows a block diagram of a communications manager that supports preconfigured uplink resource response signaling in accordance with aspects of the present disclosure.

FIG. 11 shows a block diagram 1100 of a communications manager 1120 that supports preconfigured uplink resource response signaling in accordance with aspects of the present disclosure. The communications manager 1120 may be an example of aspects of a communications manager 920, a communications manager 1020, or both, as described herein. The communications manager 1120, or various components thereof, may be an example of means for performing various aspects of preconfigured uplink resource response signaling as described herein. For example, the communications manager 1120 may include a PUR configuration manager 1125, a connection state manager 1130, a data transmission manager 1135, a monitoring manager 1140, a configurable time offset manager 1145, an RTT manager 1150, a periodicity manager 1155, a system parameter manager 1160, a PUR response message manager 1165, a control message manager 1170, or any combination thereof. Each of these components may communicate, directly or indirectly, with one another (e.g., via one or more buses).

The communications manager 1120 may support wireless communications at a UE in accordance with examples as disclosed herein. The PUR configuration manager 1125 may be configured as or otherwise support a means for receiving preconfigured uplink resource configuration information from a network device while the UE is in a connected state. The connection state manager 1130 may be configured as or otherwise support a means for transitioning from the connected state. The data transmission manager 1135 may be configured as or otherwise support a means for transmitting, to the network device, a data transmission during a preconfigured uplink resource occasion in accordance with the preconfigured uplink resource configuration information and while the UE is outside of the connected state. The monitoring manager 1140 may be configured as or otherwise support a means for monitoring for a preconfigured uplink resource response message from the network device after a configurable time offset triggered by the data transmission.

In some examples, the configurable time offset manager 1145 may be configured as or otherwise support a means for receiving, from the network device, an indication of the configurable time offset.

In some examples, the control message manager 1170 may be configured as or otherwise support a means for receiving, from the network device, a first control message including the preconfigured uplink resource configuration information, the first control message including an instruction to transition out of the connected state and the indication of the configurable time offset.

In some examples, the control message manager 1170 may be configured as or otherwise support a means for receiving, from the network device, a first control message including an indication of the configurable time offset. In some examples, the control message manager 1170 may be configured as or otherwise support a means for receiving, from the network device, a second control message including the preconfigured uplink resource configuration information and an instruction to transition out of the connected state.

In some examples, the RTT manager 1150 may be configured as or otherwise support a means for determining a maximum round-trip time between the UE and the network device. In some examples, the RTT manager 1150 may be configured as or otherwise support a means for selecting the configurable time offset from a set of configurable time offset values based on the maximum round-trip time.

In some examples, to support determining the maximum round-trip time between the UE and the network device, the RTT manager 1150 may be configured as or otherwise support a means for determining the maximum round-trip time based on an orbital height of a non-terrestrial network satellite serving the UE and a minimum angle of elevation of the non-terrestrial network satellite serving the UE.

In some examples, the configurable time offset defines a delay between an end of the data transmission and initiation of monitoring, by the UE, for the preconfigured uplink resource response message.

In some examples, the configurable time offset manager 1145 may be configured as or otherwise support a means for determining the configurable time offset as a summation of a base time offset with a delta time offset.

In some examples, the configurable time offset manager 1145 may be configured as or otherwise support a means for receiving the preconfigured uplink resource response message from the network device based on the monitoring.

In some examples, the preconfigured uplink resource response message includes a feedback message, a timing advance command, updated preconfigured uplink resource configuration information, an instruction to transition to the connected state, an instruction to refrain from transmitting subsequent data transmissions during subsequent preconfigured uplink resource occasions, or any combination thereof.

In some examples, communication between the UE and the network device is via a non-terrestrial network.

Additionally, or alternatively, the communications manager 1120 may support wireless communications at a UE in accordance with examples as disclosed herein. In some examples, the PUR configuration manager 1125 may be configured as or otherwise support a means for receiving preconfigured uplink resource configuration information from a network device while the UE is in a connected state. In some examples, the connection state manager 1130 may be configured as or otherwise support a means for transitioning from the connected state. In some examples, the data transmission manager 1135 may be configured as or otherwise support a means for transmitting, to the network device, a set of multiple data transmissions during a respective set of multiple preconfigured uplink resource occasions in accordance with the preconfigured uplink resource configuration information and while the UE is outside of the connected state. In some examples, the monitoring manager 1140 may be configured as or otherwise support a means for monitoring for one or more preconfigured uplink resource response messages from the network device, where a number of the one or more preconfigured uplink resource response messages is less than the set of multiple data transmissions transmitted by the UE.

In some examples, the periodicity manager 1155 may be configured as or otherwise support a means for receiving, from the network device, an indication of a periodicity for monitoring for the one or more preconfigured uplink resource response messages.

In some examples, to support monitoring for the one or more preconfigured uplink resource response messages, the periodicity manager 1155 may be configured as or otherwise support a means for monitoring for the one or more preconfigured uplink resource response messages once per period within the periodicity, where each period includes more than one of the set of multiple preconfigured uplink resource occasions.

In some examples, the period is based on a number of preconfigured uplink resource occasions.

In some examples, the period is based on a time duration.

In some examples, the system parameter manager 1160 may be configured as or otherwise support a means for determining one or more system parameter values pertaining to a deployment of the network device. In some examples, the system parameter manager 1160 may be configured as or otherwise support a means for selecting a periodicity from a set of periodicities for monitoring for the one or more preconfigured uplink resource response messages based on the one or more system parameter values.

In some examples, a maximum round-trip time for communications between the UE and a satellite in a non-terrestrial network used for communications between the UE and the network device, an orbital height of the satellite, an angle of elevation of the satellite with reference to the UE, or any combination thereof.

In some examples, the monitoring manager 1140 may be configured as or otherwise support a means for receiving, from the network device, an indication of a next instance when the UE is to monitor for a preconfigured uplink resource response message of the one or more preconfigured uplink resource response messages.

In some examples, to support receiving the indication of the next instance for the UE to monitor for the preconfigured uplink resource response message, the monitoring manager 1140 may be configured as or otherwise support a means for receiving the indication in a previous preconfigured uplink resource response message that is different from the preconfigured uplink resource response message indicated by the indication.

In some examples, the PUR response message manager 1165 may be configured as or otherwise support a means for transmitting, to the network device, a request that the network device transmit a preconfigured uplink resource response message, where monitoring for the one or more preconfigured uplink resource response messages includes monitoring for the requested preconfigured uplink resource response message.

In some examples, the request is included in one of the set of multiple data transmissions.

In some examples, the PUR response message manager 1165 may be configured as or otherwise support a means for receiving a preconfigured uplink resource response message from the one or more preconfigured uplink resource response messages, where the received preconfigured uplink resource response message includes feedback information for multiple data transmissions of the set of multiple data transmissions.

In some examples, communication between the UE and the network device is via a non-terrestrial network.

Figure 12:
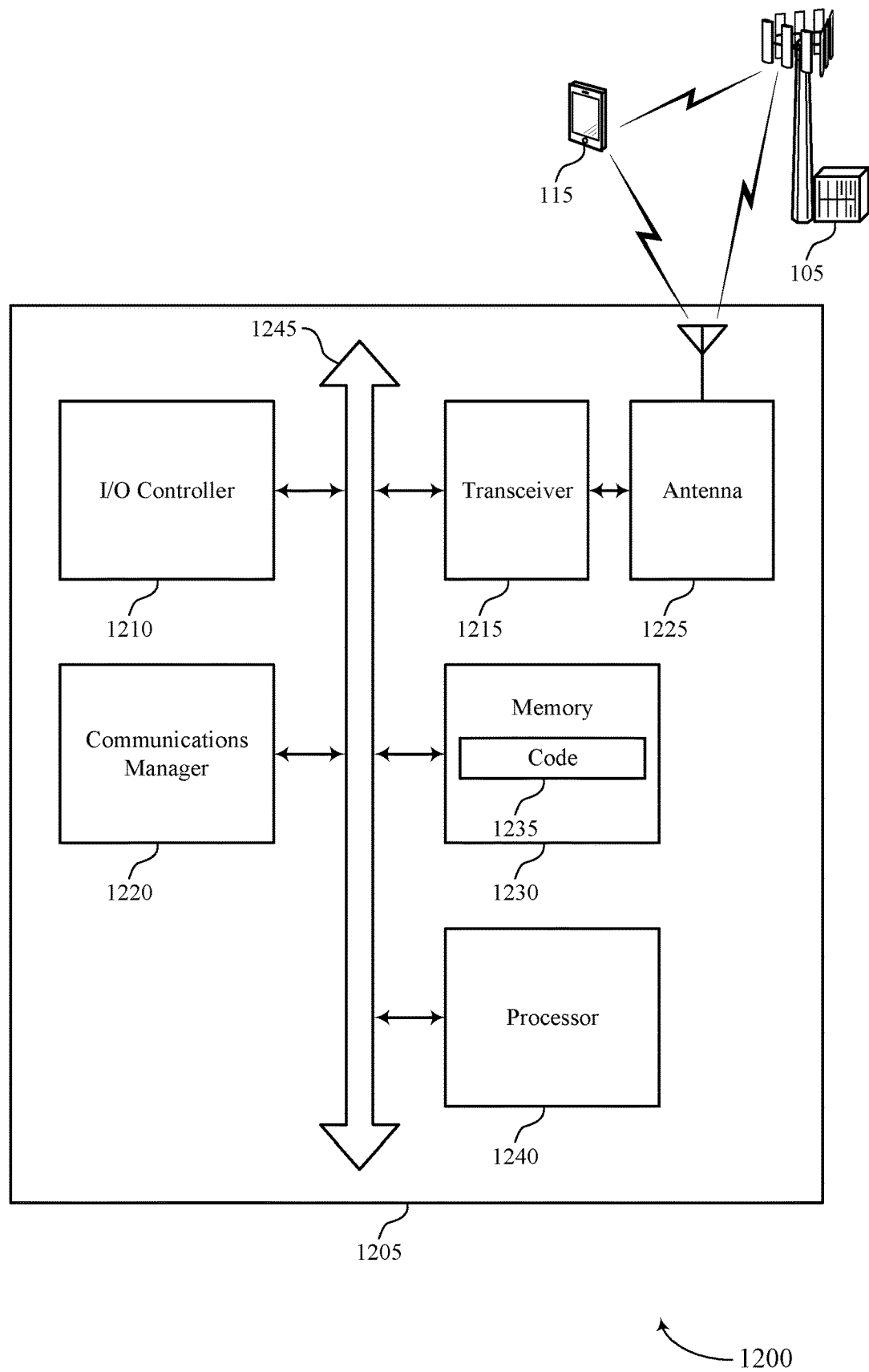
FIG. 12 shows a diagram of a system including a device that supports preconfigured uplink resource response signaling in accordance with aspects of the present disclosure.

FIG. 12 shows a diagram of a system 1200 including a device 1205 that supports preconfigured uplink resource response signaling in accordance with aspects of the present disclosure. The device 1205 may be an example of or include the components of a device 905, a device 1005, or a UE 115 as described herein. The device 1205 may communicate wirelessly with one or more base stations 105, UEs 115, or any combination thereof. The device 1205 may include components for bi-directional voice and data communications including components for transmitting and receiving communications, such as a communications manager 1220, an input/output (I/O) controller 1210, a transceiver 1215, an antenna 1225, a memory 1230, code 1235, and a processor 1240. These components may be in electronic communication or otherwise coupled (e.g., operatively, communicatively, functionally, electronically, electrically) via one or more buses (e.g., a bus 1245).

The I/O controller 1210 may manage input and output signals for the device 1205. The I/O controller 1210 may also manage peripherals not integrated into the device 1205. In some cases, the I/O controller 1210 may represent a physical connection or port to an external peripheral. In some cases, the I/O controller 1210 may utilize an operating system such as iOS®, ANDROID®, MS-DOS®, MS-WINDOWS®, OS/2®, UNIX®, LINUX®, or another known operating system. Additionally, or alternatively, the I/O controller 1210 may represent or interact with a modem, a keyboard, a mouse, a touchscreen, or a similar device. In some cases, the I/O controller 1210 may be implemented as part of a processor, such as the processor 1240. In some cases, a user may interact with the device 1205 via the I/O controller 1210 or via hardware components controlled by the I/O controller 1210.

In some cases, the device 1205 may include a single antenna 1225. However, in some other cases, the device 1205 may have more than one antenna 1225, which may be capable of concurrently transmitting or receiving multiple wireless transmissions. The transceiver 1215 may communicate bi-directionally, via the one or more antennas 1225, wired, or wireless links as described herein. For example, the transceiver 1215 may represent a wireless transceiver and may communicate bi-directionally with another wireless transceiver. The transceiver 1215 may also include a modem to modulate the packets, to provide the modulated packets to one or more antennas 1225 for transmission, and to demodulate packets received from the one or more antennas 1225. The transceiver 1215, or the transceiver 1215 and one or more antennas 1225, may be an example of a transmitter 915, a transmitter 1015, a receiver 910, a receiver 1010, or any combination thereof or component thereof, as described herein.

The memory 1230 may include random access memory (RAM) and read-only memory (ROM). The memory 1230 may store computer-readable, computer-executable code 1235 including instructions that, when executed by the processor 1240, cause the device 1205 to perform various functions described herein. The code 1235 may be stored in a non-transitory computer-readable medium such as system memory or another type of memory. In some cases, the code 1235 may not be directly executable by the processor 1240 but may cause a computer (e.g., when compiled and executed) to perform functions described herein. In some cases, the memory 1230 may contain, among other things, a basic I/O system (BIOS) which may control basic hardware or software operation such as the interaction with peripheral components or devices.

The processor 1240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof).

In some cases, the processor 1240 may be configured to operate a memory array using a memory controller. In some other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting preconfigured uplink resource response signaling). For example, the device 1205 or a component of the device 1205 may include a processor 1240 and memory 1230 coupled to the processor 1240, the processor 1240 and memory 1230 configured to perform various functions described herein.

The communications manager 1220 may support wireless communications at a UE in accordance with examples as disclosed herein. For example, the communications manager 1220 may be configured as or otherwise support a means for receiving preconfigured uplink resource configuration information from a network device while the UE is in a connected state. The communications manager 1220 may be configured as or otherwise support a means for transitioning from the connected state. The communications manager 1220 may be configured as or otherwise support a means for transmitting, to the network device, a data transmission during a preconfigured uplink resource occasion in accordance with the preconfigured uplink resource configuration information and while the UE is outside of the connected state. The communications manager 1220 may be configured as or otherwise support a means for monitoring for a preconfigured uplink resource response message from the network device after a configurable time offset triggered by the data transmission.

Additionally, or alternatively, the communications manager 1220 may support wireless communications at a UE in accordance with examples as disclosed herein. For example, the communications manager 1220 may be configured as or otherwise support a means for receiving preconfigured uplink resource configuration information from a network device while the UE is in a connected state. The communications manager 1220 may be configured as or otherwise support a means for transitioning from the connected state. The communications manager 1220 may be configured as or otherwise support a means for transmitting, to the network device, a set of multiple data transmissions during a respective set of multiple preconfigured uplink resource occasions in accordance with the preconfigured uplink resource configuration information and while the UE is outside of the connected state. The communications manager 1220 may be configured as or otherwise support a means for monitoring for one or more preconfigured uplink resource response messages from the network device, where a number of the one or more preconfigured uplink resource response messages is less than the set of multiple data transmissions transmitted by the UE.

By including or configuring the communications manager 1220 in accordance with examples as described herein, the device 1205 may support techniques for PUR communications using a configurable time offset, and a variable timing for PUR response message signaling, resulting in more efficient use of computational resources, increased battery life, efficient use of available time-frequency resources, or the like.

In some examples, the communications manager 1220 may be configured to perform various operations (e.g., receiving, monitoring, transmitting) using or otherwise in cooperation with the transceiver 1215, the one or more antennas 1225, or any combination thereof. Although the communications manager 1220 is illustrated as a separate component, in some examples, one or more functions described with reference to the communications manager 1220 may be supported by or performed by the processor 1240, the memory 1230, the code 1235, or any combination thereof. For example, the code 1235 may include instructions executable by the processor 1240 to cause the device 1205 to perform various aspects of preconfigured uplink resource response signaling as described herein, or the processor 1240 and the memory 1230 may be otherwise configured to perform or support such operations.

Figure 13:
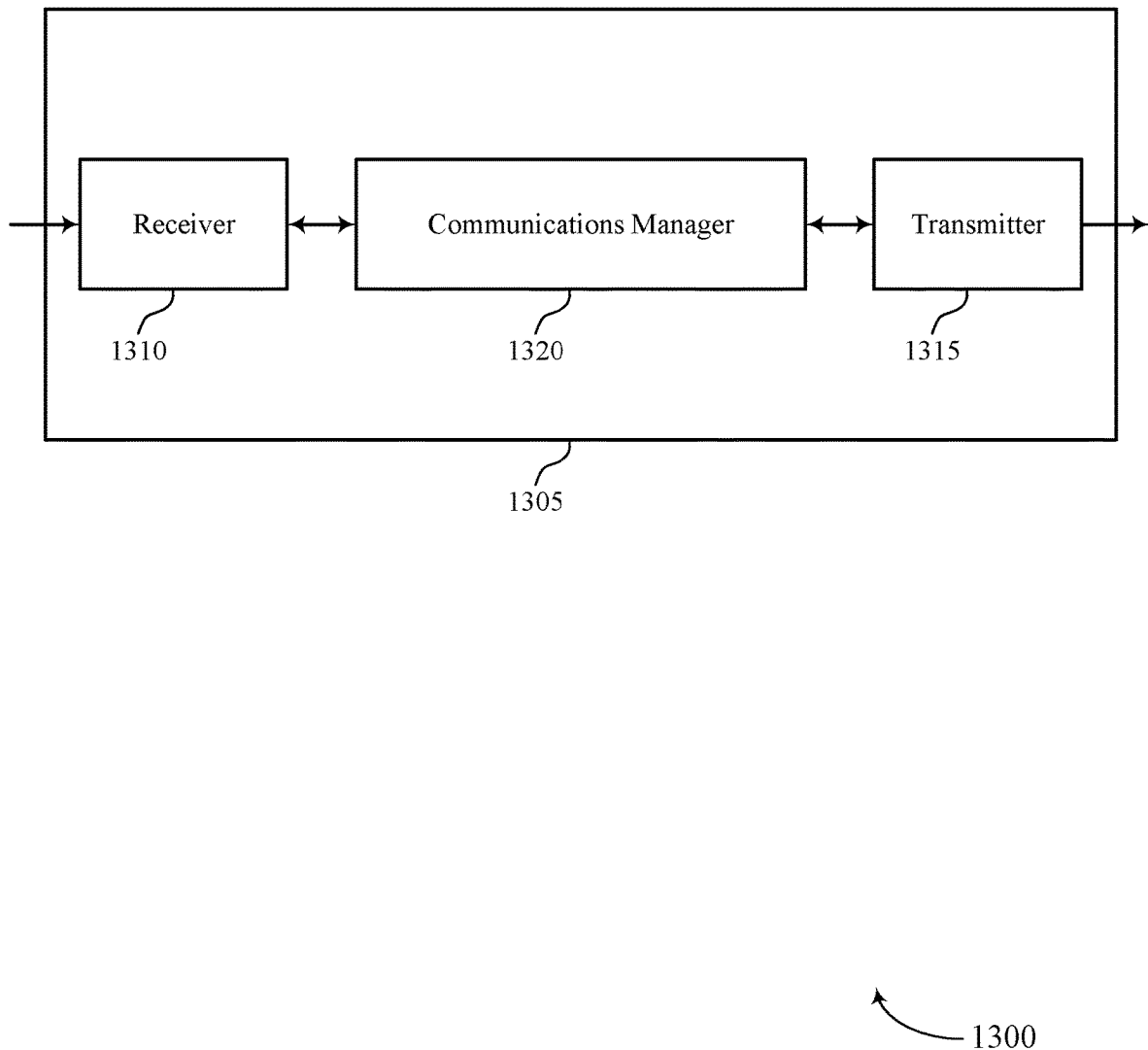
FIGS. 13 and 14 show block diagrams of devices that support preconfigured uplink resource response signaling in accordance with aspects of the present disclosure.

FIG. 13 shows a block diagram 1300 of a device 1305 that supports preconfigured uplink resource response signaling in accordance with aspects of the present disclosure. The device 1305 may be an example of aspects of a base station 105 as described herein. The device 1305 may include a receiver 1310, a transmitter 1315, and a communications manager 1320. The device 1305 may also include a processor. Each of these components may be in communication with one another (e.g., via one or more buses).

The receiver 1310 may provide a means for receiving information such as packets, user data, control information, or any combination thereof associated with various information channels (e.g., control channels, data channels, information channels related to preconfigured uplink resource response signaling). Information may be passed on to other components of the device 1305. The receiver 1310 may utilize a single antenna or a set of multiple antennas.

The transmitter 1315 may provide a means for transmitting signals generated by other components of the device 1305. For example, the transmitter 1315 may transmit information such as packets, user data, control information, or any combination thereof associated with various information channels (e.g., control channels, data channels, information channels related to preconfigured uplink resource response signaling). In some examples, the transmitter 1315 may be co-located with a receiver 1310 in a transceiver module. The transmitter 1315 may utilize a single antenna or a set of multiple antennas.

The communications manager 1320, the receiver 1310, the transmitter 1315, or various combinations thereof or various components thereof may be examples of means for performing various aspects of preconfigured uplink resource response signaling as described herein. For example, the communications manager 1320, the receiver 1310, the transmitter 1315, or various combinations or components thereof may support a method for performing one or more of the functions described herein.

In some examples, the communications manager 1320, the receiver 1310, the transmitter 1315, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1320, the receiver 1310, the transmitter 1315, or various combinations or components thereof may be implemented in code (e.g., as communications management software or firmware) executed by a processor. If implemented in code executed by a processor, the functions of the communications manager 1320, the receiver 1310, the transmitter 1315, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1320 may be configured to perform various operations (e.g., receiving, monitoring, transmitting) using or otherwise in cooperation with the receiver 1310, the transmitter 1315, or both. For example, the communications manager 1320 may receive information from the receiver 1310, send information to the transmitter 1315, or be integrated in combination with the receiver 1310, the transmitter 1315, or both to receive information, transmit information, or perform various other operations as described herein.

The communications manager 1320 may support wireless communications at a network device in accordance with examples as disclosed herein. For example, the communications manager 1320 may be configured as or otherwise support a means for transmitting preconfigured uplink resource configuration information from to a UE while the UE is in a connected state. The communications manager 1320 may be configured as or otherwise support a means for receiving, from the UE based on transmitting the preconfigured uplink resource configuration information, a data transmission during a preconfigured uplink resource occasion in accordance with the preconfigured uplink resource configuration information and while the UE is outside of the connected state. The communications manager 1320 may be configured as or otherwise support a means for transmitting, to the UE based on receiving the data transmission, a preconfigured uplink resource response message after a configurable time offset triggered by the data transmission.

Additionally, or alternatively, the communications manager 1320 may support wireless communications at a network device in accordance with examples as disclosed herein. For example, the communications manager 1320 may be configured as or otherwise support a means for transmitting preconfigured uplink resource configuration information to a UE device while the UE is in a connected state. The communications manager 1320 may be configured as or otherwise support a means for receiving, from the UE, a set of multiple data transmissions during a respective set of multiple preconfigured uplink resource occasions in accordance with the preconfigured uplink resource configuration information and while the UE is outside of the connected state. The communications manager 1320 may be configured as or otherwise support a means for transmitting, to the UE based on receiving the set of multiple data transmissions, one or more preconfigured uplink resource response messages, where a number of the one or more preconfigured uplink resource response messages is less than the set of multiple data transmissions transmitted by the UE.

By including or configuring the communications manager 1320 in accordance with examples as described herein, the device 1305 (e.g., a processor controlling or otherwise coupled to the receiver 1310, the transmitter 1315, the communications manager 1320, or a combination thereof) may support techniques for PUR communications using a configurable time offset, and a variable timing for PUR response message signaling, resulting in more efficient use of computational resources, increased battery life for served UEs, efficient use of available time-frequency resources, or the like.

Figure 14:
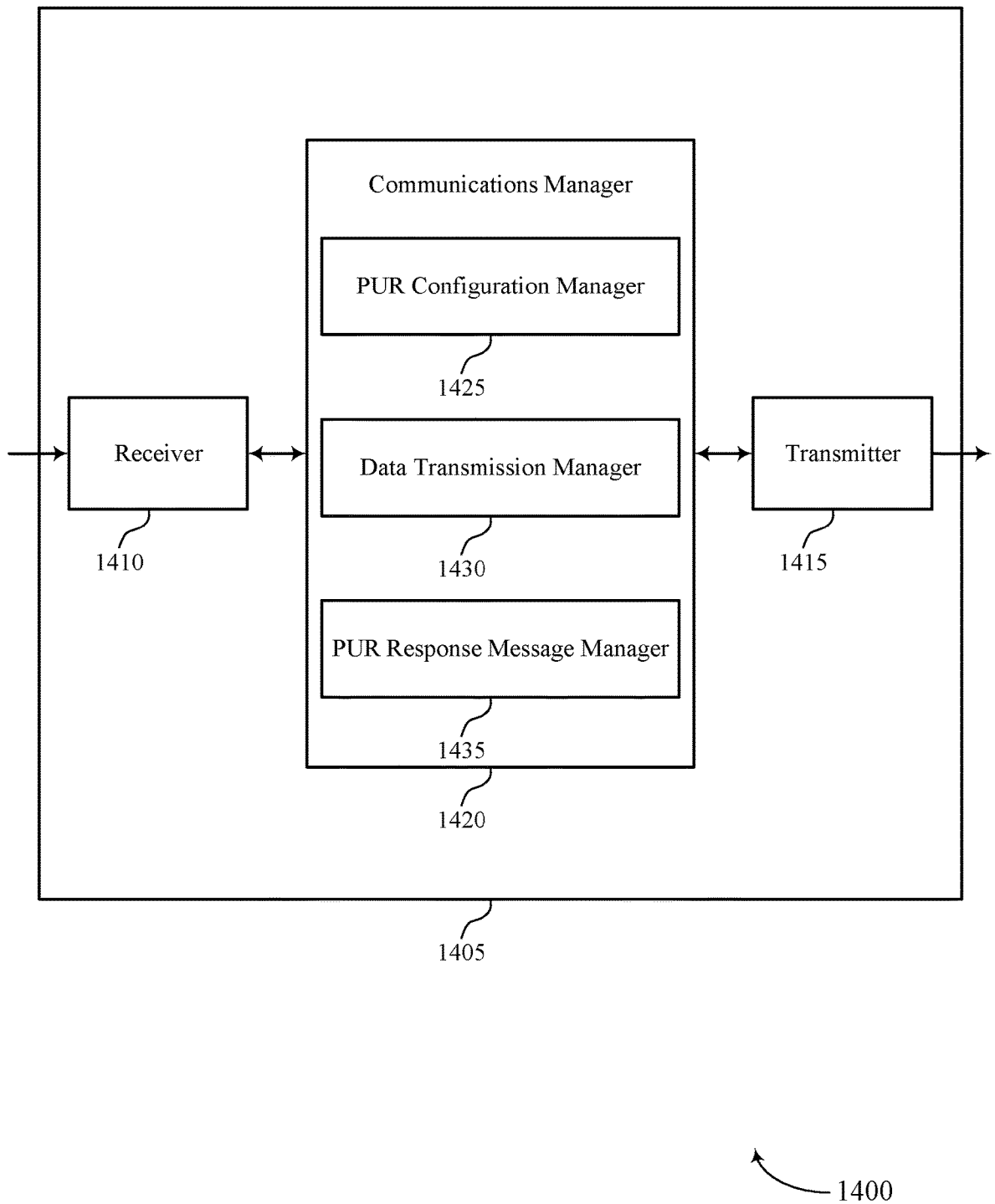

FIG. 14 shows a block diagram 1400 of a device 1405 that supports preconfigured uplink resource response signaling in accordance with aspects of the present disclosure. The device 1405 may be an example of aspects of a device 1305 or a base station 105 as described herein. The device 1405 may include a receiver 1410, a transmitter 1415, and a communications manager 1420. The device 1405 may also include a processor. Each of these components may be in communication with one another (e.g., via one or more buses).

The receiver 1410 may provide a means for receiving information such as packets, user data, control information, or any combination thereof associated with various information channels (e.g., control channels, data channels, information channels related to preconfigured uplink resource response signaling). Information may be passed on to other components of the device 1405. The receiver 1410 may utilize a single antenna or a set of multiple antennas.

The transmitter 1415 may provide a means for transmitting signals generated by other components of the device 1405. For example, the transmitter 1415 may transmit information such as packets, user data, control information, or any combination thereof associated with various information channels (e.g., control channels, data channels, information channels related to preconfigured uplink resource response signaling). In some examples, the transmitter 1415 may be co-located with a receiver 1410 in a transceiver module. The transmitter 1415 may utilize a single antenna or a set of multiple antennas.

The device 1405, or various components thereof, may be an example of means for performing various aspects of preconfigured uplink resource response signaling as described herein. For example, the communications manager 1420 may include a PUR configuration manager 1425, a data transmission manager 1430, a PUR response message manager 1435, or any combination thereof. The communications manager 1420 may be an example of aspects of a communications manager 1320 as described herein. In some examples, the communications manager 1420, or various components thereof, may be configured to perform various operations (e.g., receiving, monitoring, transmitting) using or otherwise in cooperation with the receiver 1410, the transmitter 1415, or both. For example, the communications manager 1420 may receive information from the receiver 1410, send information to the transmitter 1415, or be integrated in combination with the receiver 1410, the transmitter 1415, or both to receive information, transmit information, or perform various other operations as described herein.

The communications manager 1420 may support wireless communications at a network device in accordance with examples as disclosed herein. The PUR configuration manager 1425 may be configured as or otherwise support a means for transmitting preconfigured uplink resource configuration information from to a UE while the UE is in a connected state. The data transmission manager 1430 may be configured as or otherwise support a means for receiving, from the UE based on transmitting the preconfigured uplink resource configuration information, a data transmission during a preconfigured uplink resource occasion in accordance with the preconfigured uplink resource configuration information and while the UE is outside of the connected state. The PUR response message manager 1435 may be configured as or otherwise support a means for transmitting, to the UE based on receiving the data transmission, a preconfigured uplink resource response message after a configurable time offset triggered by the data transmission.

Additionally, or alternatively, the communications manager 1420 may support wireless communications at a network device in accordance with examples as disclosed herein. The PUR configuration manager 1425 may be configured as or otherwise support a means for transmitting preconfigured uplink resource configuration information to a UE device while the UE is in a connected state. The data transmission manager 1430 may be configured as or otherwise support a means for receiving, from the UE, a set of multiple data transmissions during a respective set of multiple preconfigured uplink resource occasions in accordance with the preconfigured uplink resource configuration information and while the UE is outside of the connected state. The PUR response message manager 1435 may be configured as or otherwise support a means for transmitting, to the UE based on receiving the set of multiple data transmissions, one or more preconfigured uplink resource response messages, where a number of the one or more preconfigured uplink resource response messages is less than the set of multiple data transmissions transmitted by the UE.

Figure 15:
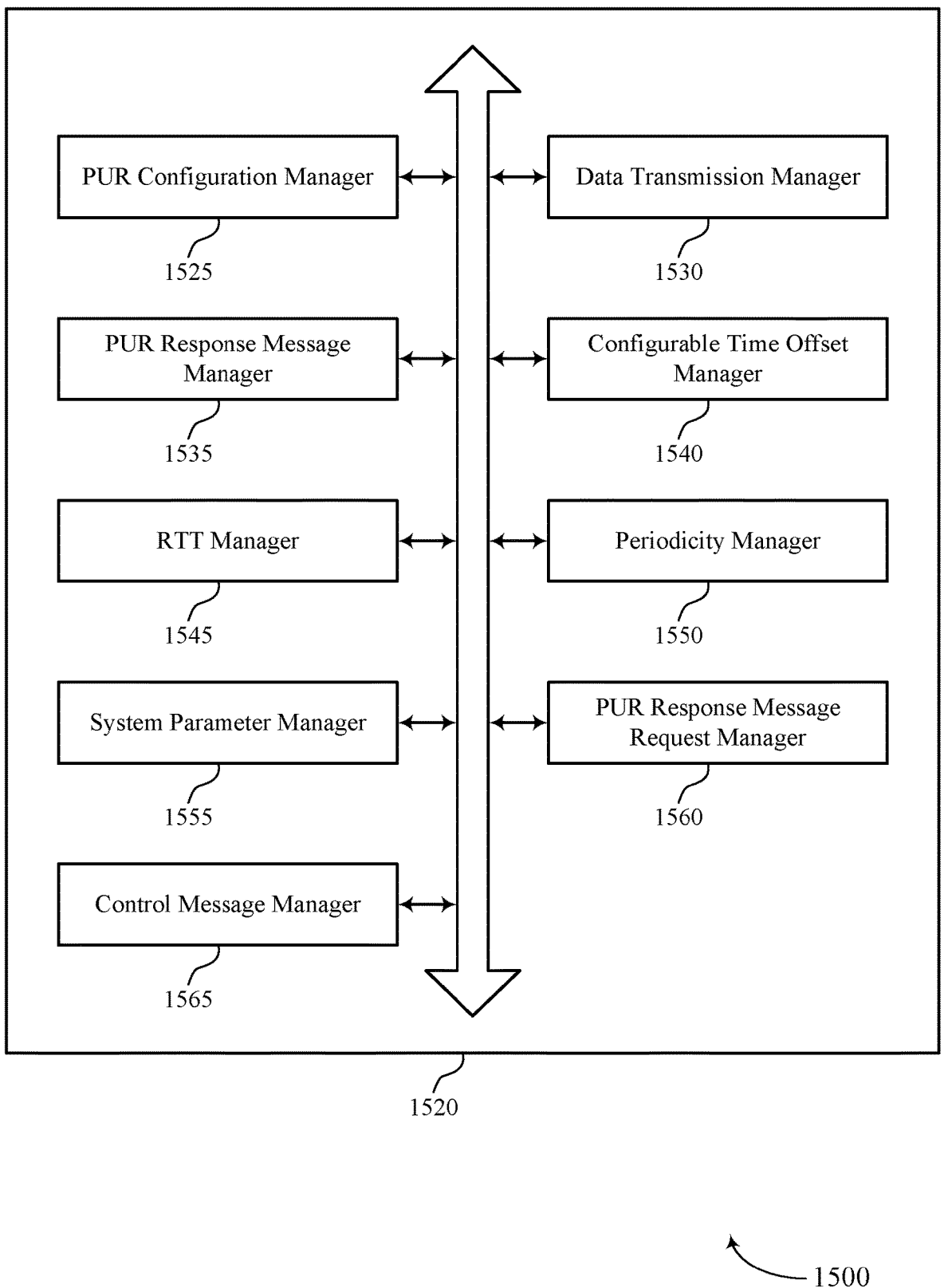
FIG. 15 shows a block diagram of a communications manager that supports preconfigured uplink resource response signaling in accordance with aspects of the present disclosure.

FIG. 15 shows a block diagram 1500 of a communications manager 1520 that supports preconfigured uplink resource response signaling in accordance with aspects of the present disclosure. The communications manager 1520 may be an example of aspects of a communications manager 1320, a communications manager 1420, or both, as described herein. The communications manager 1520, or various components thereof, may be an example of means for performing various aspects of preconfigured uplink resource response signaling as described herein. For example, the communications manager 1520 may include a PUR configuration manager 1525, a data transmission manager 1530, a PUR response message manager 1535, a configurable time offset manager 1540, an RTT manager 1545, a periodicity manager 1550, a system parameter manager 1555, a PUR response message request manager 1560, a control message manager 1565, or any combination thereof. Each of these components may communicate, directly or indirectly, with one another (e.g., via one or more buses).

The communications manager 1520 may support wireless communications at a network device in accordance with examples as disclosed herein. The PUR configuration manager 1525 may be configured as or otherwise support a means for transmitting preconfigured uplink resource configuration information from to a UE while the UE is in a connected state. The data transmission manager 1530 may be configured as or otherwise support a means for receiving, from the UE based on transmitting the preconfigured uplink resource configuration information, a data transmission during a preconfigured uplink resource occasion in accordance with the preconfigured uplink resource configuration information and while the UE is outside of the connected state. The PUR response message manager 1535 may be configured as or otherwise support a means for transmitting, to the UE based on receiving the data transmission, a preconfigured uplink resource response message after a configurable time offset triggered by the data transmission.

In some examples, the configurable time offset manager 1540 may be configured as or otherwise support a means for transmitting, to the UE, an indication of the configurable time offset.

In some examples, the control message manager 1565 may be configured as or otherwise support a means for transmitting, to the UE, a first control message including the preconfigured uplink resource configuration information, the first control message including an instruction to transition out of the connected state and the indication of the configurable time offset.

In some examples, the control message manager 1565 may be configured as or otherwise support a means for transmitting, to the UE, a first control message including an indication of the configurable time offset. In some examples, the control message manager 1565 may be configured as or otherwise support a means for transmitting, to the UE, a second control message including the preconfigured uplink resource configuration information and an instruction to transition out of the connected state.

In some examples, the RTT manager 1545 may be configured as or otherwise support a means for determining a maximum round-trip time between the UE and the network device. In some examples, the RTT manager 1545 may be configured as or otherwise support a means for selecting the configurable time offset from a set of configurable time offset values based on the maximum round-trip time.

In some examples, to support determining the maximum round-trip time between the UE and the network device, the RTT manager 1545 may be configured as or otherwise support a means for determining the maximum round-trip time based on an orbital height of a non-terrestrial network satellite serving the UE and a minimum angle of elevation of the non-terrestrial network satellite serving the UE.

In some examples, the configurable time offset manager 1540 may be configured as or otherwise support a means for where the configurable time offset defines a delay between an end of the data transmission and initiation of monitoring, by the UE, for the preconfigured uplink resource response message.

In some examples, the configurable time offset manager 1540 may be configured as or otherwise support a means for determining the configurable time offset as a summation of a base time offset with a delta time offset.

In some examples, the preconfigured uplink resource response message includes a feedback message, a timing advance command, updated preconfigured uplink resource configuration information, an instruction to transition to the connected state, an instruction to refrain from transmitting subsequent data transmissions during subsequent preconfigured uplink resource occasions, or any combination thereof.

In some examples, communication between the UE and the network device is via a non-terrestrial network.

Additionally, or alternatively, the communications manager 1520 may support wireless communications at a network device in accordance with examples as disclosed herein. In some examples, the PUR configuration manager 1525 may be configured as or otherwise support a means for transmitting preconfigured uplink resource configuration information to a UE device while the UE is in a connected state. In some examples, the data transmission manager 1530 may be configured as or otherwise support a means for receiving, from the UE, a set of multiple data transmissions during a respective set of multiple preconfigured uplink resource occasions in accordance with the preconfigured uplink resource configuration information and while the UE is outside of the connected state. In some examples, the PUR response message manager 1535 may be configured as or otherwise support a means for transmitting, to the UE based on receiving the set of multiple data transmissions, one or more preconfigured uplink resource response messages, where a number of the one or more preconfigured uplink resource response messages is less than the set of multiple data transmissions transmitted by the UE.

In some examples, the periodicity manager 1550 may be configured as or otherwise support a means for transmitting, to the UE, an indication of a periodicity for monitoring for the one or more preconfigured uplink resource response messages.

In some examples, to support transmitting the one or more preconfigured uplink resource response messages, the periodicity manager 1550 may be configured as or otherwise support a means for transmitting the one or more preconfigured uplink resource response messages once per period within the periodicity, where each period includes more than one of the set of multiple preconfigured uplink resource occasions.

In some examples, the period is based on a number of preconfigured uplink resource occasions.

In some examples, the period is based on a time duration.

In some examples, the system parameter manager 1555 may be configured as or otherwise support a means for determining one or more system parameter values pertaining to a deployment of the network device. In some examples, the system parameter manager 1555 may be configured as or otherwise support a means for selecting a periodicity from a set of periodicities for transmitting the one or more preconfigured uplink resource response messages based on the one or more system parameter values.

In some examples, the one or more system parameter values include a maximum round-trip time for communications between the UE and a satellite in a non-terrestrial network used for communications between the UE and the network device, an orbital height of the satellite, an angle of elevation of the satellite with reference to the UE, or any combination thereof.

In some examples, the PUR response message manager 1535 may be configured as or otherwise support a means for transmitting, to the UE, an indication of a next instance when the UE is to monitor for a preconfigured uplink resource response message of the one or more preconfigured uplink resource response messages.

In some examples, to support transmitting the indication of the next instance for the UE to monitor for the preconfigured uplink resource response message, the PUR response message manager 1535 may be configured as or otherwise support a means for transmitting the indication in a previous preconfigured uplink resource response message that is different from the preconfigured uplink resource response message indicated by the indication.

In some examples, the PUR response message request manager 1560 may be configured as or otherwise support a means for receiving, from the UE, a request that the network device transmit a preconfigured uplink resource response message, where transmitting the one or more preconfigured uplink resource response messages includes transmitting the requested preconfigured uplink resource response message.

In some examples, the request is included in one of the set of multiple data transmissions.

In some examples, the PUR response message manager 1535 may be configured as or otherwise support a means for transmitting, to the UE, a preconfigured uplink resource response message from the one or more preconfigured uplink resource response messages, where the transmitted preconfigured uplink resource response message includes feedback information for multiple data transmissions of the set of multiple data transmissions.

In some examples, communication between the UE and the network device is via a non-terrestrial network.

Figure 16:
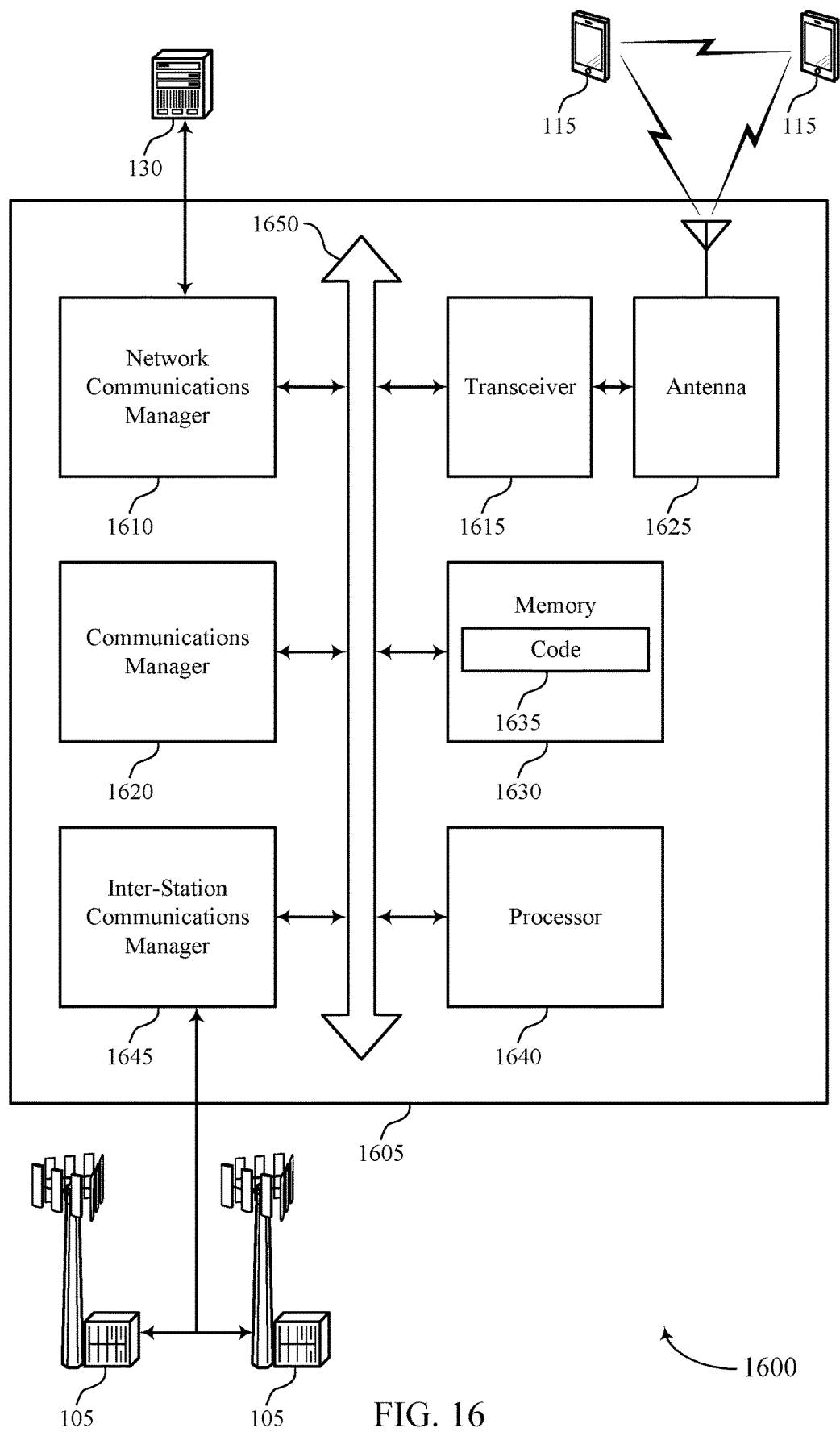
FIG. 16 shows a diagram of a system including a device that supports preconfigured uplink resource response signaling in accordance with aspects of the present disclosure.

FIG. 16 shows a diagram of a system 1600 including a device 1605 that supports preconfigured uplink resource response signaling in accordance with aspects of the present disclosure. The device 1605 may be an example of or include the components of a device 1305, a device 1405, or a base station 105 as described herein. The device 1605 may communicate wirelessly with one or more base stations 105, UEs 115, or any combination thereof. The device 1605 may include components for bi-directional voice and data communications including components for transmitting and receiving communications, such as a communications manager 1620, a network communications manager 1610, a transceiver 1615, an antenna 1625, a memory 1630, code 1635, a processor 1640, and an inter-station communications manager 1645. These components may be in electronic communication or otherwise coupled (e.g., operatively, communicatively, functionally, electronically, electrically) via one or more buses (e.g., a bus 1650).

The network communications manager 1610 may manage communications with a core network 130 (e.g., via one or more wired backhaul links). For example, the network communications manager 1610 may manage the transfer of data communications for client devices, such as one or more UEs 115.

In some cases, the device 1605 may include a single antenna 1625. However, in some other cases the device 1605 may have more than one antenna 1625, which may be capable of concurrently transmitting or receiving multiple wireless transmissions. The transceiver 1615 may communicate bi-directionally, via the one or more antennas 1625, wired, or wireless links as described herein. For example, the transceiver 1615 may represent a wireless transceiver and may communicate bi-directionally with another wireless transceiver. The transceiver 1615 may also include a modem to modulate the packets, to provide the modulated packets to one or more antennas 1625 for transmission, and to demodulate packets received from the one or more antennas 1625. The transceiver 1615, or the transceiver 1615 and one or more antennas 1625, may be an example of a transmitter 1315, a transmitter 1415, a receiver 1310, a receiver 1410, or any combination thereof or component thereof, as described herein.

The memory 1630 may include RAM and ROM. The memory 1630 may store computer-readable, computer-executable code 1635 including instructions that, when executed by the processor 1640, cause the device 1605 to perform various functions described herein. The code 1635 may be stored in a non-transitory computer-readable medium such as system memory or another type of memory. In some cases, the code 1635 may not be directly executable by the processor 1640 but may cause a computer (e.g., when compiled and executed) to perform functions described herein. In some cases, the memory 1630 may contain, among other things, a BIOS which may control basic hardware or software operation such as the interaction with peripheral components or devices.

The processor 1640 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1640 may be configured to operate a memory array using a memory controller. In some other cases, a memory controller may be integrated into the processor 1640. The processor 1640 may be configured to execute computer-readable instructions stored in a memory (e.g., the memory 1630) to cause the device 1605 to perform various functions (e.g., functions or tasks supporting preconfigured uplink resource response signaling). For example, the device 1605 or a component of the device 1605 may include a processor 1640 and memory 1630 coupled to the processor 1640, the processor 1640 and memory 1630 configured to perform various functions described herein.

The inter-station communications manager 1645 may manage communications with other base stations 105, and may include a controller or scheduler for controlling communications with UEs 115 in cooperation with other base stations 105. For example, the inter-station communications manager 1645 may coordinate scheduling for transmissions to UEs 115 for various interference mitigation techniques such as beamforming or joint transmission. In some examples, the inter-station communications manager 1645 may provide an X2 interface within an LTE/LTE-A wireless communications network technology to provide communication between base stations 105.

The communications manager 1620 may support wireless communications at a network device in accordance with examples as disclosed herein. For example, the communications manager 1620 may be configured as or otherwise support a means for transmitting preconfigured uplink resource configuration information from to a UE while the UE is in a connected state. The communications manager 1620 may be configured as or otherwise support a means for receiving, from the UE based on transmitting the preconfigured uplink resource configuration information, a data transmission during a preconfigured uplink resource occasion in accordance with the preconfigured uplink resource configuration information and while the UE is outside of the connected state. The communications manager 1620 may be configured as or otherwise support a means for transmitting, to the UE based on receiving the data transmission, a preconfigured uplink resource response message after a configurable time offset triggered by the data transmission.

Additionally, or alternatively, the communications manager 1620 may support wireless communications at a network device in accordance with examples as disclosed herein. For example, the communications manager 1620 may be configured as or otherwise support a means for transmitting preconfigured uplink resource configuration information to a UE device while the UE is in a connected state. The communications manager 1620 may be configured as or otherwise support a means for receiving, from the UE, a set of multiple data transmissions during a respective set of multiple preconfigured uplink resource occasions in accordance with the preconfigured uplink resource configuration information and while the UE is outside of the connected state. The communications manager 1620 may be configured as or otherwise support a means for transmitting, to the UE based on receiving the set of multiple data transmissions, one or more preconfigured uplink resource response messages, where a number of the one or more preconfigured uplink resource response messages is less than the set of multiple data transmissions transmitted by the UE.

By including or configuring the communications manager 1620 in accordance with examples as described herein, the device 1605 may support techniques for PUR communications using a configurable time offset, and a variable timing for PUR response message signaling, resulting in more efficient use of computational resources, increased battery life, efficient use of available time-frequency resources, or the like.

In some examples, the communications manager 1620 may be configured to perform various operations (e.g., receiving, monitoring, transmitting) using or otherwise in cooperation with the transceiver 1615, the one or more antennas 1625, or any combination thereof. Although the communications manager 1620 is illustrated as a separate component, in some examples, one or more functions described with reference to the communications manager 1620 may be supported by or performed by the processor 1640, the memory 1630, the code 1635, or any combination thereof. For example, the code 1635 may include instructions executable by the processor 1640 to cause the device 1605 to perform various aspects of preconfigured uplink resource response signaling as described herein, or the processor 1640 and the memory 1630 may be otherwise configured to perform or support such operations.

Figure 17:
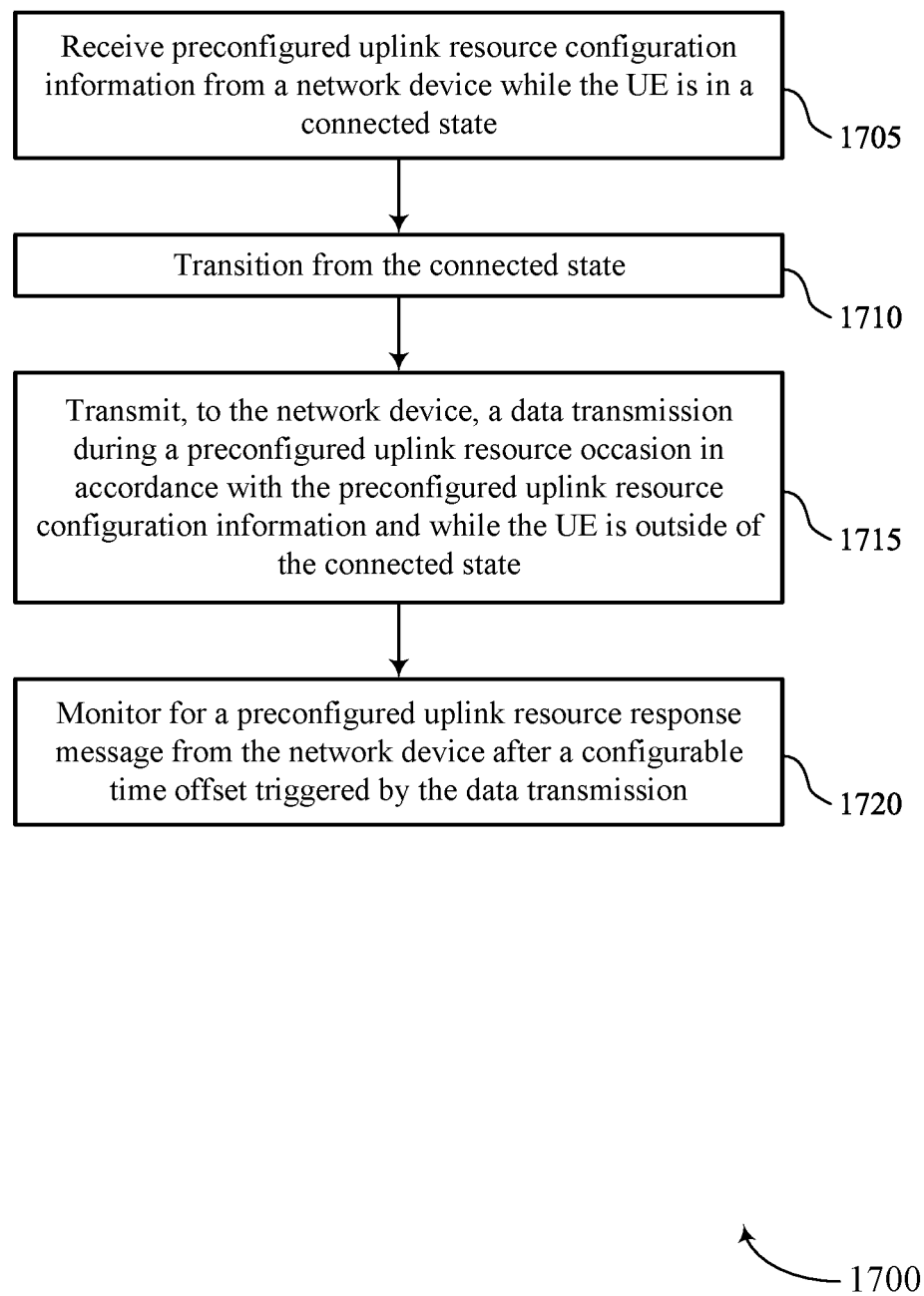
FIGS. 17 through 20 show flowcharts illustrating methods that support preconfigured uplink resource response signaling in accordance with aspects of the present disclosure.

FIG. 17 shows a flowchart illustrating a method 1700 that supports preconfigured uplink resource response signaling in accordance with aspects of the present disclosure. The operations of the method 1700 may be implemented by a UE or its components as described herein. For example, the operations of the method 1700 may be performed by a UE 115 as described with reference to FIGS. 1 through 12. In some examples, a UE may execute a set of instructions to control the functional elements of the UE to perform the described functions. Additionally, or alternatively, the UE may perform aspects of the described functions using special-purpose hardware.

At 1705, the method may include receiving preconfigured uplink resource configuration information from a network device while the UE is in a connected state. The operations of 1705 may be performed in accordance with examples as disclosed herein. In some examples, aspects of the operations of 1705 may be performed by a PUR configuration manager 1125 as described with reference to FIG. 11.

At 1710, the method may include transitioning from the connected state. The operations of 1710 may be performed in accordance with examples as disclosed herein. In some examples, aspects of the operations of 1710 may be performed by a connection state manager 1130 as described with reference to FIG. 11.

At 1715, the method may include transmitting, to the network device, a data transmission during a preconfigured uplink resource occasion in accordance with the preconfigured uplink resource configuration information and while the UE is outside of the connected state. The operations of 1715 may be performed in accordance with examples as disclosed herein. In some examples, aspects of the operations of 1715 may be performed by a data transmission manager 1135 as described with reference to FIG. 11.

At 1720, the method may include monitoring for a preconfigured uplink resource response message from the network device after a configurable time offset triggered by the data transmission. The operations of 1720 may be performed in accordance with examples as disclosed herein. In some examples, aspects of the operations of 1720 may be performed by a monitoring manager 1140 as described with reference to FIG. 11.

Figure 18:
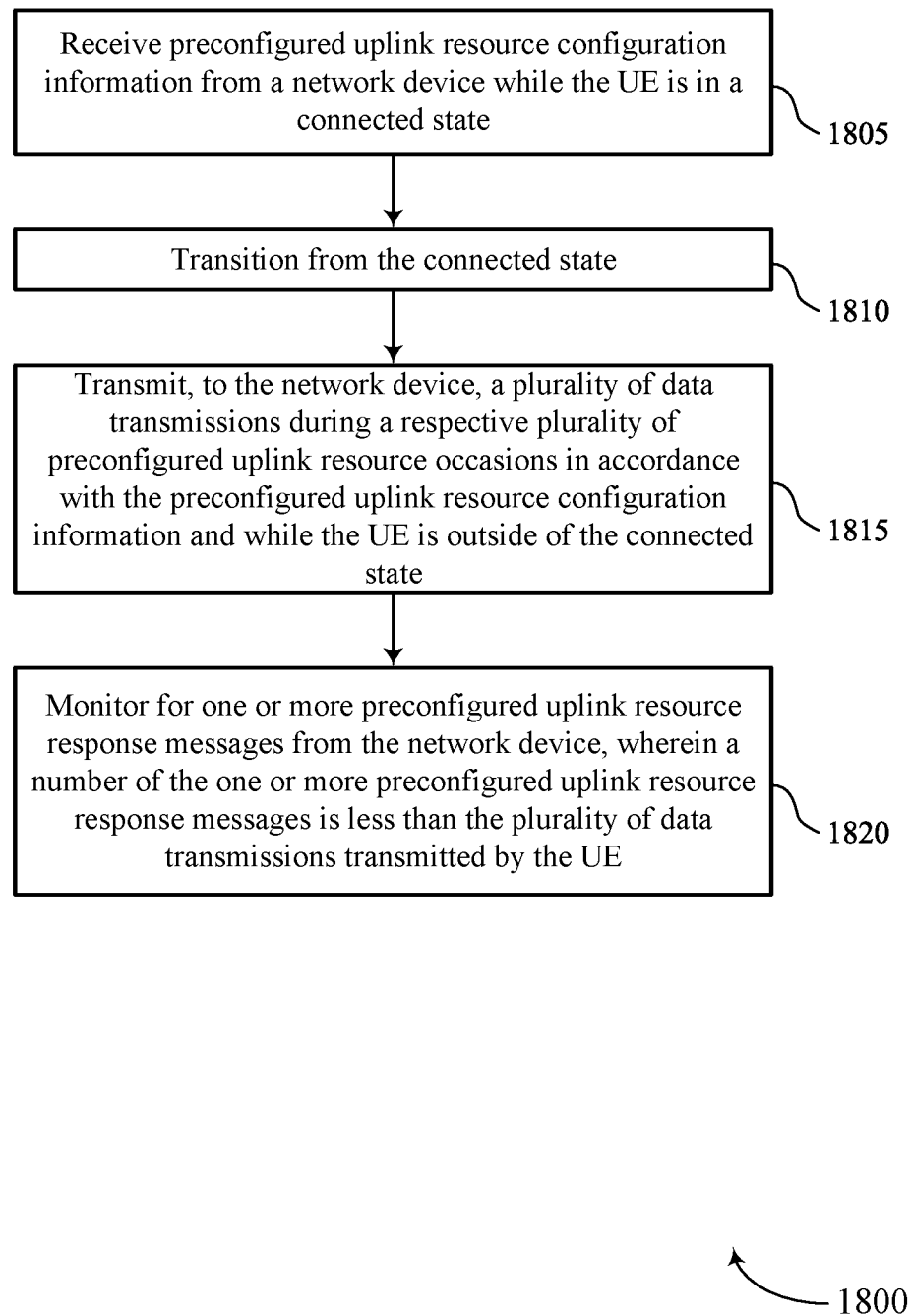

FIG. 18 shows a flowchart illustrating a method 1800 that supports preconfigured uplink resource response signaling in accordance with aspects of the present disclosure. The operations of the method 1800 may be implemented by a UE or its components as described herein. For example, the operations of the method 1800 may be performed by a UE 115 as described with reference to FIGS. 1 through 12. In some examples, a UE may execute a set of instructions to control the functional elements of the UE to perform the described functions. Additionally, or alternatively, the UE may perform aspects of the described functions using special-purpose hardware.

At 1805, the method may include receiving preconfigured uplink resource configuration information from a network device while the UE is in a connected state. The operations of 1805 may be performed in accordance with examples as disclosed herein. In some examples, aspects of the operations of 1805 may be performed by a PUR configuration manager 1125 as described with reference to FIG. 11.

At 1810, the method may include transitioning from the connected state. The operations of 1810 may be performed in accordance with examples as disclosed herein. In some examples, aspects of the operations of 1810 may be performed by a connection state manager 1130 as described with reference to FIG. 11.

At 1815, the method may include transmitting, to the network device, a set of multiple data transmissions during a respective set of multiple preconfigured uplink resource occasions in accordance with the preconfigured uplink resource configuration information and while the UE is outside of the connected state. The operations of 1815 may be performed in accordance with examples as disclosed herein. In some examples, aspects of the operations of 1815 may be performed by a data transmission manager 1135 as described with reference to FIG. 11.

At 1820, the method may include monitoring for one or more preconfigured uplink resource response messages from the network device, where a number of the one or more preconfigured uplink resource response messages is less than the set of multiple data transmissions transmitted by the UE. The operations of 1820 may be performed in accordance with examples as disclosed herein. In some examples, aspects of the operations of 1820 may be performed by a monitoring manager 1140 as described with reference to FIG. 11.

Figure 19:
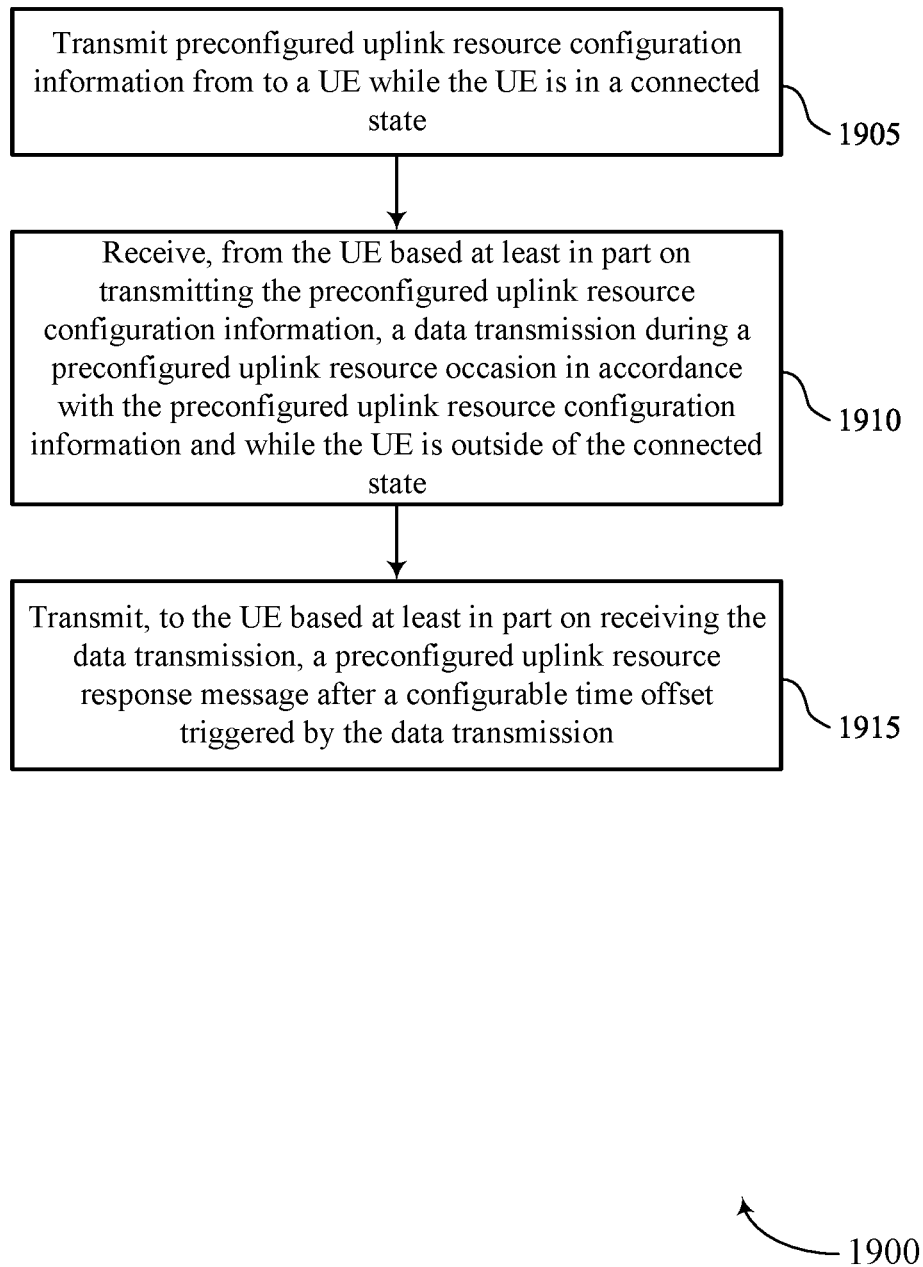

FIG. 19 shows a flowchart illustrating a method 1900 that supports preconfigured uplink resource response signaling in accordance with aspects of the present disclosure. The operations of the method 1900 may be implemented by a base station or its components as described herein. For example, the operations of the method 1900 may be performed by a base station 105 as described with reference to FIGS. 1 through 8 and 13 through 16. In some examples, a base station may execute a set of instructions to control the functional elements of the base station to perform the described functions. Additionally, or alternatively, the base station may perform aspects of the described functions using special-purpose hardware.

At 1905, the method may include transmitting preconfigured uplink resource configuration information from to a UE while the UE is in a connected state. The operations of 1905 may be performed in accordance with examples as disclosed herein. In some examples, aspects of the operations of 1905 may be performed by a PUR configuration manager 1525 as described with reference to FIG. 15.

At 1910, the method may include receiving, from the UE based on transmitting the preconfigured uplink resource configuration information, a data transmission during a preconfigured uplink resource occasion in accordance with the preconfigured uplink resource configuration information and while the UE is outside of the connected state. The operations of 1910 may be performed in accordance with examples as disclosed herein. In some examples, aspects of the operations of 1910 may be performed by a data transmission manager 1530 as described with reference to FIG. 15.

At 1915, the method may include transmitting, to the UE based on receiving the data transmission, a preconfigured uplink resource response message after a configurable time offset triggered by the data transmission. The operations of 1915 may be performed in accordance with examples as disclosed herein. In some examples, aspects of the operations of 1915 may be performed by a PUR response message manager 1535 as described with reference to FIG. 15.

Figure 20:
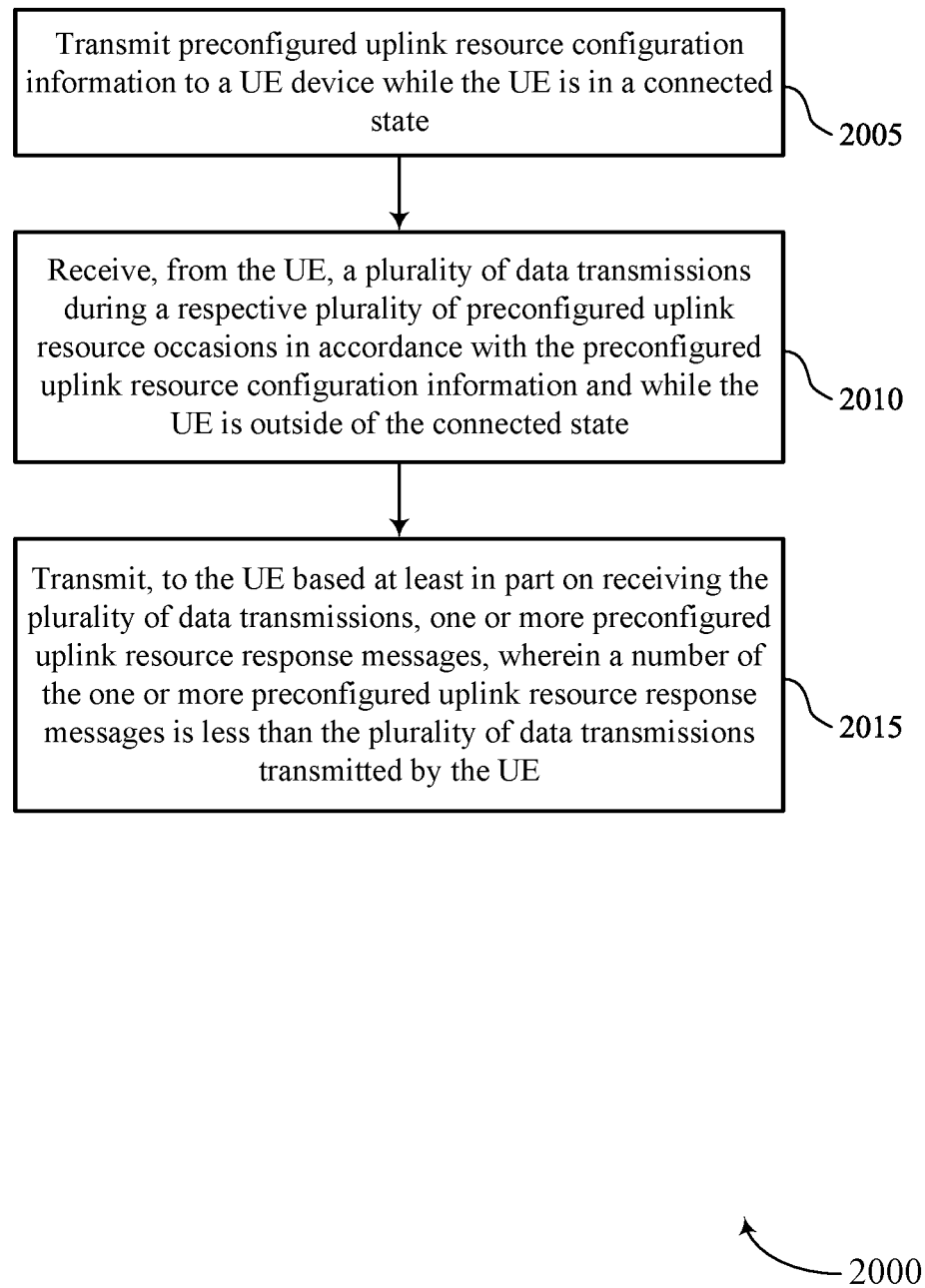

FIG. 20 shows a flowchart illustrating a method 2000 that supports preconfigured uplink resource response signaling in accordance with aspects of the present disclosure. The operations of the method 2000 may be implemented by a base station or its components as described herein. For example, the operations of the method 2000 may be performed by a base station 105 as described with reference to FIGS. 1 through 8 and 13 through 16. In some examples, a base station may execute a set of instructions to control the functional elements of the base station to perform the described functions. Additionally, or alternatively, the base station may perform aspects of the described functions using special-purpose hardware.

At 2005, the method may include transmitting preconfigured uplink resource configuration information to a UE device while the UE is in a connected state. The operations of 2005 may be performed in accordance with examples as disclosed herein. In some examples, aspects of the operations of 2005 may be performed by a PUR configuration manager 1525 as described with reference to FIG. 15.

At 2010, the method may include receiving, from the UE, a set of multiple data transmissions during a respective set of multiple preconfigured uplink resource occasions in accordance with the preconfigured uplink resource configuration information and while the UE is outside of the connected state. The operations of 2010 may be performed in accordance with examples as disclosed herein. In some examples, aspects of the operations of 2010 may be performed by a data transmission manager 1530 as described with reference to FIG. 15.

At 2015, the method may include transmitting, to the UE based on receiving the set of multiple data transmissions, one or more preconfigured uplink resource response messages, where a number of the one or more preconfigured uplink resource response messages is less than the set of multiple data transmissions transmitted by the UE. The operations of 2015 may be performed in accordance with examples as disclosed herein. In some examples, aspects of the operations of 2015 may be performed by a PUR response message manager 1535 as described with reference to FIG. 15.

Aspect 1: A method for wireless communications at a UE, comprising: receiving preconfigured uplink resource configuration information from a network device while the UE is in a connected state; transitioning from the connected state; transmitting, to the network device, a data transmission during a preconfigured uplink resource occasion in accordance with the preconfigured uplink resource configuration information and while the UE is outside of the connected state; and monitoring for a preconfigured uplink resource response message from the network device after a configurable time offset triggered by the data transmission.

Aspect 2: The method of aspect 1, further comprising: receiving, from the network device, an indication of the configurable time offset.

Aspect 3: The method of aspect 2, further comprising: receiving, from the network device, a first control message comprising the preconfigured uplink resource configuration information, the first control message comprising an instruction to transition out of the connected state and the indication of the configurable time offset.

Aspect 4: The method of any of aspects 2 through 3, further comprising: receiving, from the network device, a first control message comprising an indication of the configurable time offset; and receiving, from the network device, a second control message comprising the preconfigured uplink resource configuration information and an instruction to transition out of the connected state.

Aspect 5: The method of any of aspects 1 through 4, further comprising: determining a maximum round-trip time between the UE and the network device; and selecting the configurable time offset from a set of configurable time offset values based at least in part on the maximum round-trip time.

Aspect 6: The method of aspect 5, wherein determining the maximum round-trip time between the UE and the network device comprises: determining the maximum round-trip time based at least in part on an orbital height of a non-terrestrial network satellite serving the UE and a minimum angle of elevation of the non-terrestrial network satellite serving the UE.

Aspect 7: The method of any of aspects 1 through 6, wherein the configurable time offset defines a delay between an end of the data transmission and initiation of monitoring, by the UE, for the preconfigured uplink resource response message.

Aspect 8: The method of any of aspects 1 through 7, further comprising: determining the configurable time offset as a summation of a base time offset with a delta time offset.

Aspect 9: The method of any of aspects 1 through 8, further comprising: receiving the preconfigured uplink resource response message from the network device based at least in part on the monitoring.

Aspect 10: The method of any of aspects 1 through 9, wherein the preconfigured uplink resource response message comprises a feedback message, a timing advance command, updated preconfigured uplink resource configuration information, an instruction to transition to the connected state, an instruction to refrain from transmitting subsequent data transmissions during subsequent preconfigured uplink resource occasions, or any combination thereof.

Aspect 11: The method of any of aspects 1 through 10, wherein communication between the UE and the network device is via a non-terrestrial network.

Aspect 12: A method for wireless communications at a UE, comprising: receiving preconfigured uplink resource configuration information from a network device while the UE is in a connected state; transitioning from the connected state; transmitting, to the network device, a plurality of data transmissions during a respective plurality of preconfigured uplink resource occasions in accordance with the preconfigured uplink resource configuration information and while the UE is outside of the connected state; and monitoring for one or more preconfigured uplink resource response messages from the network device, wherein a number of the one or more preconfigured uplink resource response messages is less than the plurality of data transmissions transmitted by the UE.

Aspect 13: The method of aspect 12, further comprising: receiving, from the network device, an indication of a periodicity for monitoring for the one or more preconfigured uplink resource response messages.

Aspect 14: The method of aspect 13, wherein monitoring for the one or more preconfigured uplink resource response messages further comprises: monitoring for the one or more preconfigured uplink resource response messages once per period within the periodicity, wherein each period comprises more than one of the plurality of preconfigured uplink resource occasions.

Aspect 15: The method of aspect 14, wherein the period is based on a number of preconfigured uplink resource occasions.

Aspect 16: The method of any of aspects 14 through 15, wherein the period is based on a time duration.

Aspect 17: The method of any of aspects 12 through 16, further comprising: determining one or more system parameter values pertaining to a deployment of the network device; and selecting a periodicity from a set of periodicities for monitoring for the one or more preconfigured uplink resource response messages based at least in part on the one or more system parameter values.

Aspect 18: The method of aspect 17, wherein the one or more system parameter values comprise a maximum round-trip time for communications between the UE and a satellite in a non-terrestrial network used for communications between the UE and the network device, an orbital height of the satellite, an angle of elevation of the satellite with reference to the UE, or any combination thereof.

Aspect 19: The method of any of aspects 12 through 18, further comprising: receiving, from the network device, an indication of a next instance when the UE is to monitor for a preconfigured uplink resource response message of the one or more preconfigured uplink resource response messages.

Aspect 20: The method of aspect 19, wherein receiving the indication of the next instance for the UE to monitor for the preconfigured uplink resource response message comprises: receiving the indication in a previous preconfigured uplink resource response message that is different from the preconfigured uplink resource response message indicated by the indication.

Aspect 21: The method of any of aspects 12 through 20, further comprising: transmitting, to the network device, a request that the network device transmit a preconfigured uplink resource response message, wherein monitoring for the one or more preconfigured uplink resource response messages comprises monitoring for the requested preconfigured uplink resource response message.

Aspect 22: The method of aspect 21, wherein the request is included in one of the plurality of data transmissions.

Aspect 23: The method of any of aspects 12 through 22, further comprising: receiving a preconfigured uplink resource response message from the one or more preconfigured uplink resource response messages, wherein the received preconfigured uplink resource response message includes feedback information for multiple data transmissions of the plurality of data transmissions.

Aspect 24: The method of any of aspects 12 through 23, wherein communication between the UE and the network device is via a non-terrestrial network.

Aspect 25: A method for wireless communications at a network device, comprising: transmitting preconfigured uplink resource configuration information from to a UE while the UE is in a connected state; receiving, from the UE based at least in part on transmitting the preconfigured uplink resource configuration information, a data transmission during a preconfigured uplink resource occasion in accordance with the preconfigured uplink resource configuration information and while the UE is outside of the connected state; and transmitting, to the UE based at least in part on receiving the data transmission, a preconfigured uplink resource response message after a configurable time offset triggered by the data transmission.

Aspect 26: The method of aspect 25, further comprising: transmitting, to the UE, an indication of the configurable time offset.

Aspect 27: The method of aspect 26, further comprising: transmitting, to the UE, a first control message comprising the preconfigured uplink resource configuration information, the first control message comprising an instruction to transition out of the connected state and the indication of the configurable time offset.

Aspect 28: The method of any of aspects 26 through 27, further comprising: transmitting, to the UE, a first control message comprising an indication of the configurable time offset; and transmitting, to the UE, a second control message comprising the preconfigured uplink resource configuration information and an instruction to transition out of the connected state.

Aspect 29: The method of any of aspects 25 through 28, further comprising: determining a maximum round-trip time between the UE and the network device; and selecting the configurable time offset from a set of configurable time offset values based at least in part on the maximum round-trip time.

Aspect 30: The method of aspect 29, wherein determining the maximum round-trip time between the UE and the network device comprises: determining the maximum round-trip time based at least in part on an orbital height of a non-terrestrial network satellite serving the UE and a minimum angle of elevation of the non-terrestrial network satellite serving the UE.

Aspect 31: The method of any of aspects 25 through 30, further comprising: wherein the configurable time offset defines a delay between an end of the data transmission and initiation of monitoring, by the UE, for the preconfigured uplink resource response message.

Aspect 32: The method of any of aspects 25 through 31, further comprising: determining the configurable time offset as a summation of a base time offset with a delta time offset.

Aspect 33: The method of any of aspects 25 through 32, wherein the preconfigured uplink resource response message comprises a feedback message, a timing advance command, updated preconfigured uplink resource configuration information, an instruction to transition to the connected state, an instruction to refrain from transmitting subsequent data transmissions during subsequent preconfigured uplink resource occasions, or any combination thereof.

Aspect 34: The method of any of aspects 25 through 33, wherein communication between the UE and the network device is via a non-terrestrial network.

Aspect 35: A method for wireless communications at a network device, comprising: transmitting preconfigured uplink resource configuration information to a UE device while the UE is in a connected state; receiving, from the UE, a plurality of data transmissions during a respective plurality of preconfigured uplink resource occasions in accordance with the preconfigured uplink resource configuration information and while the UE is outside of the connected state; and transmitting, to the UE based at least in part on receiving the plurality of data transmissions, one or more preconfigured uplink resource response messages, wherein a number of the one or more preconfigured uplink resource response messages is less than the plurality of data transmissions transmitted by the UE.

Aspect 36: The method of aspect 35, further comprising: transmitting, to the UE, an indication of a periodicity for monitoring for the one or more preconfigured uplink resource response messages.

Aspect 37: The method of aspect 36, wherein transmitting the one or more preconfigured uplink resource response messages comprises: transmitting the one or more preconfigured uplink resource response messages once per period within the periodicity, wherein each period comprises more than one of the plurality of preconfigured uplink resource occasions.

Aspect 38: The method of aspect 37, wherein the period is based on a number of preconfigured uplink resource occasions.

Aspect 39: The method of any of aspects 37 through 38, wherein the period is based on a time duration.

Aspect 40: The method of any of aspects 35 through 39, further comprising: determining one or more system parameter values pertaining to a deployment of the network device; and selecting a periodicity from a set of periodicities for transmitting the one or more preconfigured uplink resource response messages based at least in part on the one or more system parameter values.

Aspect 41: The method of aspect 40, wherein the one or more system parameter values comprise a maximum round-trip time for communications between the UE and a satellite in a non-terrestrial network used for communications between the UE and the network device, an orbital height of the satellite, an angle of elevation of the satellite with reference to the UE, or any combination thereof.

Aspect 42: The method of any of aspects 35 through 41, further comprising: transmitting, to the UE, an indication of a next instance when the UE is to monitor for a preconfigured uplink resource response message of the one or more preconfigured uplink resource response messages.

Aspect 43: The method of aspect 42, wherein transmitting the indication of the next instance for the UE to monitor for the preconfigured uplink resource response message comprises: transmitting the indication in a previous preconfigured uplink resource response message that is different from the preconfigured uplink resource response message indicated by the indication.

Aspect 44: The method of any of aspects 35 through 43, further comprising: receiving, from the UE, a request that the network device transmit a preconfigured uplink resource response message, wherein transmitting the one or more preconfigured uplink resource response messages comprises transmitting the requested preconfigured uplink resource response message.

Aspect 45: The method of aspect 44, wherein the request is included in one of the plurality of data transmissions.

Aspect 46: The method of any of aspects 35 through 45, further comprising: transmitting, to the UE, a preconfigured uplink resource response message from the one or more preconfigured uplink resource response messages, wherein the transmitted preconfigured uplink resource response message includes feedback information for multiple data transmissions of the plurality of data transmissions.

Aspect 47: The method of any of aspects 35 through 46, wherein communication between the UE and the network device is via a non-terrestrial network.

Aspect 48: An apparatus for wireless communications at a UE, comprising a processor; memory coupled with the processor; and instructions stored in the memory and executable by the processor to cause the apparatus to perform a method of any of aspects 1 through 11.

Aspect 49: An apparatus for wireless communications at a UE, comprising at least one means for performing a method of any of aspects 1 through 11.

Aspect 50: A non-transitory computer-readable medium storing code for wireless communications at a UE, the code comprising instructions executable by a processor to perform a method of any of aspects 1 through 11.

Aspect 51: An apparatus for wireless communications at a UE, comprising a processor; memory coupled with the processor; and instructions stored in the memory and executable by the processor to cause the apparatus to perform a method of any of aspects 12 through 24.

Aspect 52: An apparatus for wireless communications at a UE, comprising at least one means for performing a method of any of aspects 12 through 24.

Aspect 53: A non-transitory computer-readable medium storing code for wireless communications at a UE, the code comprising instructions executable by a processor to perform a method of any of aspects 12 through 24.

Aspect 54: An apparatus for wireless communications at a network device, comprising a processor; memory coupled with the processor; and instructions stored in the memory and executable by the processor to cause the apparatus to perform a method of any of aspects 25 through 34.

Aspect 55: An apparatus for wireless communications at a network device, comprising at least one means for performing a method of any of aspects 25 through 34.

Aspect 56: A non-transitory computer-readable medium storing code for wireless communications at a network device, the code comprising instructions executable by a processor to perform a method of any of aspects 25 through 34.

Aspect 57: An apparatus for wireless communications at a network device, comprising a processor; memory coupled with the processor; and instructions stored in the memory and executable by the processor to cause the apparatus to perform a method of any of aspects 35 through 47.

Aspect 58: An apparatus for wireless communications at a network device, comprising at least one means for performing a method of any of aspects 35 through 47.

Aspect 59: A non-transitory computer-readable medium storing code for wireless communications at a network device, the code comprising instructions executable by a processor to perform a method of any of aspects 35 through 47.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a user equipment (UE), comprising:
receiving preconfigured uplink resource configuration information from a network device while the UE is in a connected state;
receiving, from the network device, an indication of a configurable time offset value for a total time offset, wherein the total time offset defines a delay between an end of a data transmission and initiation of monitoring for a preconfigured uplink resource response message;
transitioning from the connected state;
transmitting, to the network device, the data transmission during a preconfigured uplink resource occasion in accordance with the preconfigured uplink resource configuration information and while the UE is outside of the connected state; and
monitoring for the preconfigured uplink resource response message from the network device after the total time offset triggered by the data transmission.

2. The method of claim 1, further comprising:
receiving, from the network device, a first control message comprising the preconfigured uplink resource configuration information, an instruction to transition out of the connected state, and the indication of the configurable time offset value.

3. The method of claim 1, wherein receiving the indication of the configurable time offset value comprises receiving, from the network device, a first control message comprising the indication of the configurable time offset value, and
wherein receiving the preconfigured uplink resource configuration information comprises receiving, from the network device, a second control message comprising the preconfigured uplink resource configuration information and an instruction to transition out of the connected state.

4. The method of claim 3, further comprising:
determining a maximum round-trip time between the UE and the network device based at least in part on an orbital height of a non-terrestrial network satellite serving the UE and a minimum angle of elevation of the non-terrestrial network satellite serving the UE.

5. The method of claim 1, further comprising:
determining the total time offset as a summation of the configurable time offset value with a base time offset.

6. The method of claim 1, further comprising:
receiving the preconfigured uplink resource response message from the network device based at least in part on the monitoring.

7. The method of claim 1, wherein the preconfigured uplink resource response message comprises a feedback message, a timing advance command, updated preconfigured uplink resource configuration information, an instruction to transition to the connected state, an instruction to refrain from transmitting subsequent data transmissions during subsequent preconfigured uplink resource occasions, or any combination thereof.

8. A method for wireless communications at a user equipment (UE), comprising:
receiving preconfigured uplink resource configuration information from a network device while the UE is in a connected state;
transitioning from the connected state;
transmitting, to the network device, a first data transmission of a plurality of data transmissions during a first preconfigured uplink resource occasion of a plurality of preconfigured uplink resource occasions in accordance with the preconfigured uplink resource configuration information and while the UE is outside of the connected state, the first data transmission comprising first data;
transmitting, to the network device, a second data transmission of the plurality of data transmissions during a second preconfigured uplink resource occasion of the plurality of preconfigured uplink resource occasions in accordance with the preconfigured uplink resource configuration information and while the UE is outside of the connected state, the second data transmission comprising second data different from the first data;
monitoring, on a per period basis within a monitoring periodicity, for one or more preconfigured uplink resource response messages from the network device, wherein each period within the monitoring periodicity comprises more than one of the plurality of preconfigured uplink resource occasions, and wherein a quantity of the one or more preconfigured uplink resource response messages is less than a quantity of the plurality of data transmissions transmitted by the UE; and
receiving a preconfigured uplink resource response message from the one or more preconfigured uplink resource response messages, wherein the preconfigured uplink resource response message includes first feedback information for the first data transmission and second feedback information for the second data transmission.

9. The method of claim 8, further comprising:
receiving, from the network device, an indication of the monitoring periodicity, wherein the monitoring periodicity represents a periodicity for monitoring for the one or more preconfigured uplink resource response messages.

10. The method of claim 8, wherein the period is based at least in part on a time duration.

11. The method of claim 8, further comprising:
determining one or more system parameter values pertaining to a deployment of the network device; and
selecting the monitoring periodicity from a set of periodicities for monitoring for the one or more preconfigured uplink resource response messages based at least in part on the one or more system parameter values.

12. The method of claim 11, wherein the one or more system parameter values comprise a maximum round-trip time for communications between the UE and a satellite in a non-terrestrial network used for communications between the UE and the network device, an orbital height of the satellite, an angle of elevation of the satellite with reference to the UE, or any combination thereof.

13. The method of claim 8, further comprising:
receiving, from the network device, an indication of a next instance when the UE is to monitor for the preconfigured uplink resource response message of the one or more preconfigured uplink resource response messages.

14. The method of claim 13, wherein receiving the indication of the next instance for the UE to monitor for the preconfigured uplink resource response message comprises:
receiving the indication in a previous preconfigured uplink resource response message that is different from the preconfigured uplink resource response message indicated by the indication.

15. The method of claim 8, further comprising:
transmitting, to the network device, a request that the network device transmit the preconfigured uplink resource response message, wherein monitoring for the one or more preconfigured uplink resource response messages comprises monitoring for the preconfigured uplink resource response message.

16. The method of claim 15, wherein the request is included in one of the plurality of data transmissions.

17. A method for wireless communications at a network device, comprising:
transmitting preconfigured uplink resource configuration information to a user equipment (UE) while the UE is in a connected state;
transmitting, to the UE, an indication of a configurable time offset value for a total time offset, where the total time offset defines a delay between an end of a data transmission at the UE and initiation of monitoring for a preconfigured uplink resource response message by the UE;
receiving, from the UE based at least in part on transmitting the preconfigured uplink resource configuration information, the data transmission during a preconfigured uplink resource occasion in accordance with the preconfigured uplink resource configuration information and while the UE is outside of the connected state; and
transmitting, to the UE based at least in part on receiving the data transmission, the preconfigured uplink resource response message after the total time offset triggered by the data transmission.

18. A method for wireless communications at a network device, comprising:
transmitting preconfigured uplink resource configuration information to a user equipment (UE) while the UE is in a connected state;
receiving, from the UE, a first data transmission of a plurality of data transmissions during a first preconfigured uplink resource occasion of a plurality of preconfigured uplink resource occasions in accordance with the preconfigured uplink resource configuration information and while the UE is outside of the connected state, the first data transmission comprising first data;
receiving, from the UE, a second data transmission of the plurality of data transmissions during a second preconfigured uplink resource occasion of the plurality of preconfigured uplink resource occasions in accordance with the preconfigured uplink resource configuration information and while the UE is outside of the connected state, the second data transmission comprising second data different from the first data; and
transmitting, to the UE, on a per period basis within a monitoring periodicity, based at least in part on receiving the first data transmission and the second data transmission of the plurality of data transmissions, one or more preconfigured uplink resource response messages, wherein each period within the monitoring periodicity comprises more than one of the plurality of preconfigured uplink resource occasions, and wherein a quantity of the one or more preconfigured uplink resource response messages is less than a quantity of the plurality of data transmissions received from the UE, wherein a preconfigured uplink resource response message of the one or more preconfigured uplink resource response messages includes first feedback information for the first data transmission and second feedback information for the second data transmission.

19. The method of claim 18, further comprising:
transmitting, to the UE, an indication of the monitoring periodicity, wherein the monitoring periodicity represents a periodicity for monitoring for the one or more preconfigured uplink resource response messages.

20. The method of claim 18, further comprising:
determining one or more system parameter values pertaining to a deployment of the network device; and
selecting the monitoring periodicity from a set of periodicities for transmitting the one or more preconfigured uplink resource response messages based at least in part on the one or more system parameter values.

21. The method of claim 18, further comprising:
transmitting, to the UE, an indication of a next instance when the UE is to monitor for the preconfigured uplink resource response message of the one or more preconfigured uplink resource response messages.

* * * * *